United States Patent
Suzuki et al.

(10) Patent No.: US 8,856,405 B2
(45) Date of Patent: Oct. 7, 2014

(54) CONNECTION APPARATUS, STORAGE APPARATUS, AND COMPUTER-READABLE RECORDING MEDIUM HAVING CONNECTION REQUEST TRANSMISSION CONTROL PROGRAM RECORDED THEREIN

(71) Applicant: Fujitsu Limited, Kawasaki (JP)

(72) Inventors: Toshihiko Suzuki, Kawasaki (JP); Hidenori Takahashi, Yokohama (JP); Hisano Osanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/709,102

(22) Filed: Dec. 10, 2012

(65) Prior Publication Data

US 2013/0198465 A1    Aug. 1, 2013

(30) Foreign Application Priority Data

Jan. 31, 2012 (JP) .................................. 2012-018309

(51) Int. Cl.
- *G06F 3/00* (2006.01)
- *G06F 13/36* (2006.01)
- *G06F 13/18* (2006.01)

(52) U.S. Cl.
CPC ..................................... *G06F 13/18* (2013.01)
USPC .......................................... 710/40; 710/116

(58) Field of Classification Search
None
See application file for complete search history.

(56) References Cited

U.S. PATENT DOCUMENTS 8,560,746 B2 * 10/2013 Honjo et al. .................. 710/116

FOREIGN PATENT DOCUMENTS

JP    2004-118546    4/2004

* cited by examiner

*Primary Examiner* — Idriss N Alrobaye
*Assistant Examiner* — Richard B Franklin
(74) *Attorney, Agent, or Firm* — Fujitsu Patent Center

(57) ABSTRACT

A connection apparatus that connects a plurality of storage units and a controller that establishes connection with the respective storage units in response to a connection request issued from each of the plurality of storage units and accesses the storage units includes a processor; and a memory, wherein the processor transmits a connection request selected based on priority information that represents priority associated with the connection among a plurality of received connection requests to the controller, the priority information being stored in the memory, and changes priority information included in a connection request received from a certain storage unit among the plurality of storage units so that the priority information has higher priority than the priority information included in connection requests received from the other storage units for a period where a connection request is successively received from the certain storage unit and a predetermined condition is satisfied.

17 Claims, 16 Drawing Sheets

FIG. 2

22a: DRIVE TYPE INFORMATION
(STORAGE UNIT INFORMATION)

| Drive TYPE | A | B | C | D | E | F |
|---|---|---|---|---|---|---|
| BS [K Byte] (PROPERTY INFORMATION) | 30 | 150 | 75 | 100 | 35 | 50 |
| PRESCRIBED SUCCESSIVE CONNECTION COUNT | 5 | 1 | 2 | 1 | 4 | 3 |

32a: AWT MANAGEMENT TABLE
(MANAGEMENT INFORMATION)

| PhyID (PORT ID) | 0 | 1 | 2 | 3 | ... |
|---|---|---|---|---|---|
| PRESCRIBED SUCCESSIVE CONNECTION COUNT | | | | | ... |
| SUCCESSIVE CONNECTION COUNT | | | | | ... |
| AWT TIMER [μsec] | | | | | ... |
| SUCCESSIVE CONNECTION REQUEST FLAG (CONNECTION REQUEST INFORMATION) | | | | | ... |
| CONNECTION DETERMINATION FLAG (CONNECTION DETERMINATION INFORMATION) | | | | | ... |

FIG. 9

22b: DRIVE TYPE INFORMATION
(STORAGE UNIT INFORMATION)

| Drive TYPE | SSD | HDD1 | HDD2 | ... |
|---|---|---|---|---|
| ROTATION SPEED [K rpm] (PROPERTY INFORMATION) | — | 15 | 7.2 | ... |
| PRESCRIBED SUCCESSIVE CONNECTION COUNT | 3 | 2 | 1 | ... |

CONNECTION APPARATUS, STORAGE APPARATUS, AND COMPUTER-READABLE RECORDING MEDIUM HAVING CONNECTION REQUEST TRANSMISSION CONTROL PROGRAM RECORDED THEREIN

CROSS-REFERENCE TO RELATED APPLICATION

This application is based upon and claims the benefit of priority of the prior Japanese Patent Application No. 2012-018309, filed on Jan. 31, 2012, the entire contents of which are incorporated herein by reference.

FIELD

The present invention relates to a connection apparatus, a storage apparatus, a storage apparatus, and a computer-readable recording medium having connection request transmission control program recorded therein.

BACKGROUND

In a storage system, when a plurality of devices such as an HDD (Hard Disk Drive) compatible with SAS (Serial Attached SCSI (Small Computer System Interface)) is mounted, a SAS expander (hereinafter referred to as an expander) is often used.

FIG. 10 is a diagram illustrating a configuration example of a storage system that includes a SAS initiator (hereinafter referred to as an initiator) 200, expanders 300-1 and 300-2, and a plurality of SAS drives (hereinafter simply referred to as drives) 400-1 to 400-6.

As illustrated in FIG. 10, the storage system includes a storage apparatus 100 that includes a controller enclosure (hereinafter referred to as a CE) 100a and a drive enclosure (hereinafter referred to as a DE) 100b, and a host computer 500.

The host computer 500 is a device that issues a data access request such as requests to write and read data to and from the SAS drive 400 included in the storage apparatus 100. An information processing apparatus such as a server is an example of the host computer 500.

The CE 100a performs control associated with the data access request issued from the host computer 500 to the drive 400, and includes the initiator 200, the expander 300-1, and the drives 400-1 to 400-3.

The DE 100b includes the expander 300-2 and the drives 400-4 to 400-6.

In the following description, the expanders 300-1 and 300-2 will be denoted by reference sign 300 when they are not distinguished from each other, and the drives 400-1 to 400-6 will be denoted by reference sign 400 when they are not distinguished from each other. Further, the drives 400-1 to 400-6 are sometimes referred to as drives A to F, respectively, using the reference signs in FIG. 10. The reference signs A to F represent the SAS addresses of the drives 400, respectively.

The initiator 200 is a module that manages the subordinate drives 400 and allocates an appropriate drive 400 to the data access request from the host computer 500.

Moreover, the initiator 200 accesses an access target drive 400 via the subordinate expander 300-1 or the expanders 300-1 and 300-2.

The expander 300-1 is a SAS switch for expanding a SAS connection, and includes a SAS control device and a Phy which is a SAS physical port.

Moreover, the expander 300-1 is connected to the initiator 200, the drives 400-1 to 400-3, and the expander 300-2 in the subordinate DE 120 via the Phy and transmits information such as commands and data associated with the access between the initiator 200 and the access target drive 400.

The expander 300-2 has the same configuration as the expander 300-1. The expander 300-2 is connected to the superordinate expander 300-1 and the drives 400-4 to 400-6 via a Phy (a physical port) (not illustrated) and transmits information associated with the access between the initiator 200 and the access target drive 400.

Next, an example of the sequence associated with writing and reading of data from the initiator 200 to the drive 400 will be described with reference to FIGS. 11 and 12.

FIG. 11 is a diagram for explaining an example of the sequence associated with a write command in the SAS protocol, and FIG. 12 is a diagram for explaining an example of the sequence of a read command in the SAS protocol.

In FIGS. 11 and 12, "INIT" represents the initiator 200, and "TARG" represents the access target drive 400. Moreover, arrows denoted by broken lines represent primitives, and arrows denoted by solid lines represent frames. For the sake of simple description, FIGS. 11 and 12 illustrate the command sequence of a case (a P to P case) where the initiator 200 and the access target drive 400 are connected without via the expander 300.

First, a write sequence will be described. As illustrated in FIG. 11, the initiator 200 issues OPEN_Address_Frame (hereinafter referred to as OAF) to the drive 400. If the drive 400 accepts the frame, the drive 400 returns OPEN_ACCEPT and connection is established (see (a) in FIG. 11).

Subsequently, the initiator 200 issues Wt_CMD (write command) to the drive 400. When Wt_CMD is properly received, the drive 400 returns ACK (see (b) in FIG. 11).

Moreover, the initiator 200 and the drive 400 exchange DONE and CLOSE, and the connection is closed (see (c) in FIG. 11). Hereinafter, the sequence (c) will be collectively referred to as a "Close process" as indicated by arrows denoted by one-dot chain lines.

Subsequently, when the drive 400 issues OAF to the initiator 200, the initiator 200 returns OPEN_ACCEPT to the drive 400, and connection is established (see (d) in FIG. 11).

Further, the drive 400 issues XFER_Rdy to the initiator 200 and closes the connection (see (e) in FIG. 11). The initiator 200 determines a data amount of write data (Wt_DATA) that the drive 400 receives in the next connection according to the value of a burst length (or a burst size which will be also referred to as a BS) included in the XFER_Rdy.

Moreover, when the initiator 200 issues the OAF and the connection is established (see (f) in FIG. 11), the initiator 200 embeds an amount of write data designated in the BS of the received XFER_Rdy in (e) in DATA_FRAME and sends the DATA_FRAME to the drive (see (g) in FIG. 11). The drive 400 returns ACK when the returned DATA_FRAME is proper, and returns RRDY when the drive 400 can receive the DATA_FRAME.

When transmission of the write data ends, the close process is performed to close the connection (see (h) in FIG. 11).

When there is write data which was not transmitted in (g), the drive 400 reissues XFER_Rdy and receives write data (see (i) in FIG. 11).

Upon receiving all items of write data, the drive 400 establishes the connection and sends Good_Status to the initiator 200, and the write sequence ends (see (j) in FIG. 11).

Next, a read sequence will be described. As illustrated in FIG. 12, when a connection is established as in (a) of FIG. 11, the initiator 200 issues Rd_CMD (read command) to the drive 400. When the Rd_CMD is properly received, the drive 400 returns ACK and closes the connection (see (k) in FIG. 12).

Subsequently, when the drive 400 issues OAF to the initiator 200, the initiator 200 returns OPEN_ACCEPT to the drive 400, and connection is established (see (l) in FIG. 12).

After the connection is established, the drive 400 transmits read data (Rd_DATA) to the initiator 200 (see (m) in FIG. 12). If it is not possible to transmit the data at a time, connection is reestablished, and the Rd_DATA is transmitted (see (n) in FIG. 12).

When it was possible for the drive 400 to transmit data properly, the drive 400 sends Good_Status to the initiator 200, and the read sequence ends (see (o) in FIG. 12).

The OAF described above includes AWT (Arbitration Wait Time). The AWT represents a wait period after the drive 400 requests a connection. When the expander 300 receives OAF from a plurality of drives 400, the expander 300 transmits the OAF having the largest AWT among the OAFs issued by the drives 400 preferentially to the initiator 200, and establishes the connection with the corresponding drive 400.

Hereinafter, a connection establishment sequence when a plurality of drives 400 issues OAF to the initiator 200 in a storage system will be described with reference to FIGS. 13 to 15.

FIGS. 13 to 15 are diagrams for explaining an example of a connection establishment sequence between the initiator 200 and the drive 400 in the storage system illustrated in FIG. 10.

In FIGS. 13 to 15, OAF is illustrated as OPEN FRAME.

The expander 300-2 receives OAF from subordinate drives D to F for a predetermined period. Hereinafter, this predetermined period will be referred to as an OAF reception period.

For example, it is assumed that the drives D and F have issued OAF to the expander 300-2 in order to establish a connection with the initiator 200 (see (1) in FIG. 13).

After the elapse of the OAF reception period, the expander 300-2 sends OAF having the greatest AWT among the OAFs received from the drives D and F to the expander 300-1. In this case, since the AWT of the drive D is the same as the AWT of the drive F, the expander 300-2 sends the OAF of the drive F, of which the SAS address has the larger value, to the expander 300-1 (see (2) in FIG. 13).

On the other hand, the expander 300-1 also receives OAF from the drives A to C and the subordinate expander 300-2 for a predetermined period (OAF reception period). After the elapse of the OAF reception period, the expander 300-1 sends the OAF having the greatest AWT received from the drive 400 to the initiator 200. In the example of FIG. 13, since the sent OAF is only the OAF of the drive F transmitted from the expander 300-2, the expander 300-1 transmits the OAF of the drive F to the initiator 200 (see (3) in FIG. 13).

Subsequently, as illustrated in (4) of FIG. 14, upon receiving the OAF, the initiator 200 transmits OPEN_ACCEPT to the drive F which is the issuer of the received OAF via the expanders 300-1 and 300-2.

Upon receiving the OPEN_ACCEPT, the drive F transmits a predetermined frame to the initiator 200 (see (5) in FIG. 14).

When all frames have been transmitted, the drive F exchanges DONE and CLOSE primitives with the initiator 200 and performs a close process (see (6) in FIG. 14).

Here, it is assumed that 200 µs has passed until the connection of the drive F ends in (6) of FIG. 14 after the drive D transmits OAF in (1) of FIG. 13.

Moreover, as illustrated in (7) of FIG. 15, it is assumed that the drives D and F issued OAF within another OAF reception period. In this case, the drive D sets a wait period (µs) from the OAF issued in (1) of FIG. 13 to the AWT and includes the wait period in the issued OAF. The respective drives 400 issue the OAF periodically when establishing connection.

After the elapse of the OAF reception period, the expander 300-2 sends the OAF having the greatest AWT received from the drives D and F to the expander 300-1. In this case, the AWT (200 µs) of the drive D is greater than the AWT (0 µs) of the drive F, the expander 300-2 sends the OAF of the drive D to the expander 300-1 (see (8) in FIG. 15).

Moreover, it is assumed that the expander 300-2 has issued the OAF of the drive D (see (8) in FIG. 15) and the OAF of the drive A to the expander 300-1 within the OAF reception period (see (9) in FIG. 15).

After the elapse of the OAF reception period, the expander 300-1 compares the AWT (200 µs) of the OAF received from the expander 300-2 and the AWT (0 µs) of the OAF of the drive A and issues the OAF having the greater AWT, that is, the OAF of the drive D issued from the expander 300-2, to the initiator 200 (see (10) in FIG. 15).

Moreover, upon receiving the OAF, the initiator 200 transmits OPEN_ACCEPT to the drive D which is the issuer of the received OAF via the expanders 300-1 and 300-2, and connection is established (see (11) in FIG. 15).

Patent Document 1: Japanese Laid-Open Patent Publication No. 2004-118546

However, as described above, in the storage system, in the write sequence according to the SAS protocol, before the write data is transmitted from the initiator 200 to the drive 400, a command (XFER_Rdy) is issued from a write target drive 400 (see (e) in FIG. 11).

The XFER_Rdy includes the BS that represents the size of the write data that the drive 400 receives in the connection, and the initiator 200 transmits the write data according to the BS.

Here, a case where the drive 400 is in the busy state, that is, the drive 400 issues a new OAF immediately after the connection close process, will be considered. In this case, when drives 400 having different burst lengths (BS) are present together in the storage system, there is a problem in that the performance of the drive 400 having a small burst length is degraded.

For example, an example of a data transmission operation when OAF is issued from the drives A and B in the storage system illustrated in FIG. 10, and the burst length of the drive A is shorter than the burst length of the drive B will be described with reference to FIG. 16.

FIG. 16 is a diagram illustrating an example of a data transmission operation in a storage system where drives A and B having different burst lengths are present together.

As illustrated in FIG. 16, a case where the BS of the drive A is 30 Kbytes, and the BS of the drive B is 150 Kbytes will be considered.

First, the drives A and B issue OAF within the OAF reception period of the expander 300-1. Since the AWTs of the received OAFs have the same value, the expander 300-1 transmits the OAF of the drive B, of which the SAS address is the greater, to the initiator 200, and connection is established between the drive B and the initiator 200 (see (i) in FIG. 16).

Subsequently, when the drive B transmits XFER_Rdy including the BS to the initiator 200, the initiator 200 transmits an amount of write data (150 Kbytes) corresponding to the data amount requested in the XFER_Rdy and closes the connection when the transmission is completed (see (ii) in FIG. 16).

Since the connection is closed, the expander 300-1 receives OAF again. In this case, the drive A issues OAF, in which A1 µs which is the wait period from the previous OAF is set to AWT, to the expander 300-1. Moreover, the drive B issues OAF in which 0 µs is set to AWT. The expander 300-1 transmits the OAF of the drive A, of which the value of the AWT is the greatest among a plurality of received OAFs, to the initiator 200, and connection is established between the drive A and the initiator 200 (see (iii) in FIG. 16).

Subsequently, when the drive A transmits XFER_Rdy to the initiator 200, the initiator 200 transmits an amount of write data (30 Kbytes) corresponding to the data amount requested in the XFER_Rdy and closes the connection when the transmission is completed (see (iv) in FIG. 16).

In the next OAF reception period, the drive A issues OAF, in which 0 µs is set to the AWT, to the expander 300-1. Moreover, the drive B issues OAF in which B1 µs which is the wait period from the previous OAF is set to the AWT. The expander 300-1 transmits the OAF of the drive B, of which the value of the AWT is the greater, to the initiator 200, and connection is established between the drive B and the initiator 200 (see (v) in FIG. 16).

Subsequently to (v) in FIG. 16, the drives A and B successively issue OAF. That is, the drive A that has issued the OAF of which the AWT is A2 µs acquires connection after the elapse of the next OAF reception period, and the drive B that has issued the OAF of which the AWT is B2 µs acquires connection after the elapse of the subsequent OAF reception period.

As described above, when drives having different BSs which are the sizes of data that can be transmitted in one connection are present together, the drive B can receive 150 Kbytes of data in one connection, whereas the drive A can receive only 30 Kbytes of data. Thus, as illustrated in FIG. 16, when all of the drives A and B successively issue OAF, the drive A has to wait until the drive B receives 150 Kbytes of data when receiving the next 30 Kbytes of data. Thus, there is a problem in that the performance of drives such as the drive A having a small BS is degraded greatly as compared to their original performance. This problem is more noticeable in high-performance drives with a small BS.

In FIG. 16, although a case where the expander 300-1 receives the OAFs from the subordinate drives A and B has been described as an example, the above-described problem also occurs when the expander 300-1 receives another OAF from the expander 300-2 and when the expander 300-2 receives the OAFs from the subordinate drives D to F.

Moreover, in FIG. 16, although an operation or writing data to the drive 400 has been described as an example, the above-described problem also occurs in a read operation and other operations when a plurality of drives 400 having different performance issue OAF to the initiator 200.

Without being limited to the case where drives having different BSs are present together, the problem in which the performance of high-performance drives is greatly degraded as compared to the original performance occurs in a case where drives with different performances are present due to various causes such as a write or read speed and a disc rotation speed.

SUMMARY

According to an aspect of the present invention, there is provided a connection apparatus that connects a plurality of storage units and a controller that establishes connections with the respective storage units in response to a connection request issued from each of the plurality of storage units and accesses the storage units, the connection apparatus including: a processor; and a memory, wherein the processor transmits a connection request selected based on priority information that represents priority associated with the connection among a plurality of received connection requests to the controller, the priority information being stored in the memory, and changes priority information included in a connection request received from a certain storage unit among the plurality of storage units so that the priority information has higher priority than the priority information included in connection requests received from the other storage units for a period where a connection request is successively received from the certain storage unit and a predetermined condition is satisfied.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of drive type information stored in an initiator according to the present embodiment;

FIG. 7 is a flowchart for explaining an example of an operation of setting a prescribed successive connection count of the initiator according to the present embodiment when performance information of drives is not known during system power-on;

FIG. 9 is a diagram illustrating drive type information to be stored by an initiator according to a modification example of the present embodiment;

DESCRIPTION OF EMBODIMENTS

Embodiments of the invention will be described below with reference to the drawings.

(1) Embodiment

(1-1) Configuration Example of Storage System

Figure 1:
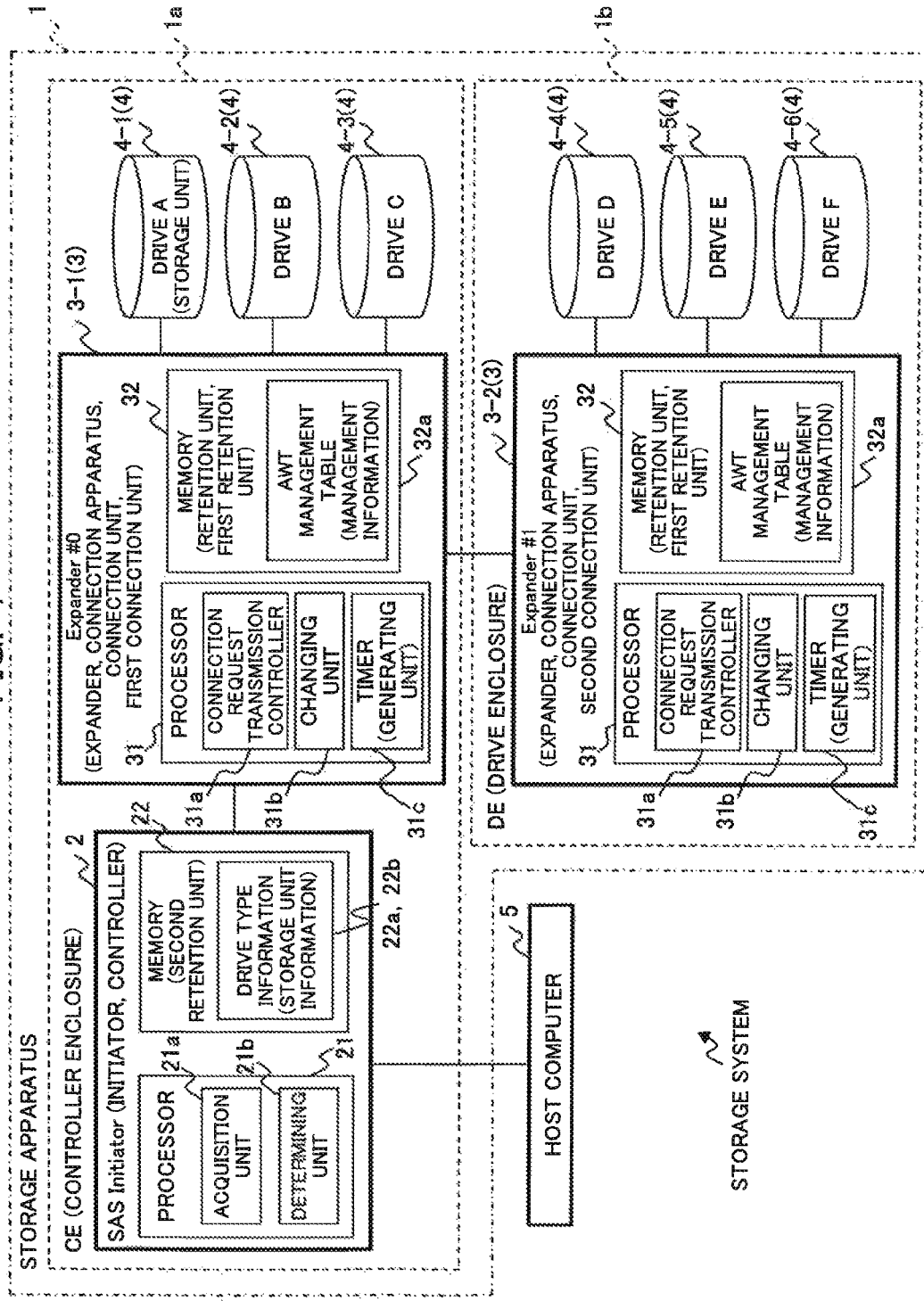
FIG. 1 is a diagram illustrating a configuration example of a storage system according to an embodiment.
Figure 3:
FIG. 3 is a diagram illustrating an example of an AWT management table stored in an expander according to the present embodiment.

FIG. 1 is a diagram illustrating a configuration example of a storage system according to an embodiment; FIG. 2 is a diagram illustrating an example of drive type information 22a stored in an initiator 2, and FIG. 3 is a diagram illustrating an example of an AWT management table 32a stored in expanders 3-1 and 3-2.

Figure 10:
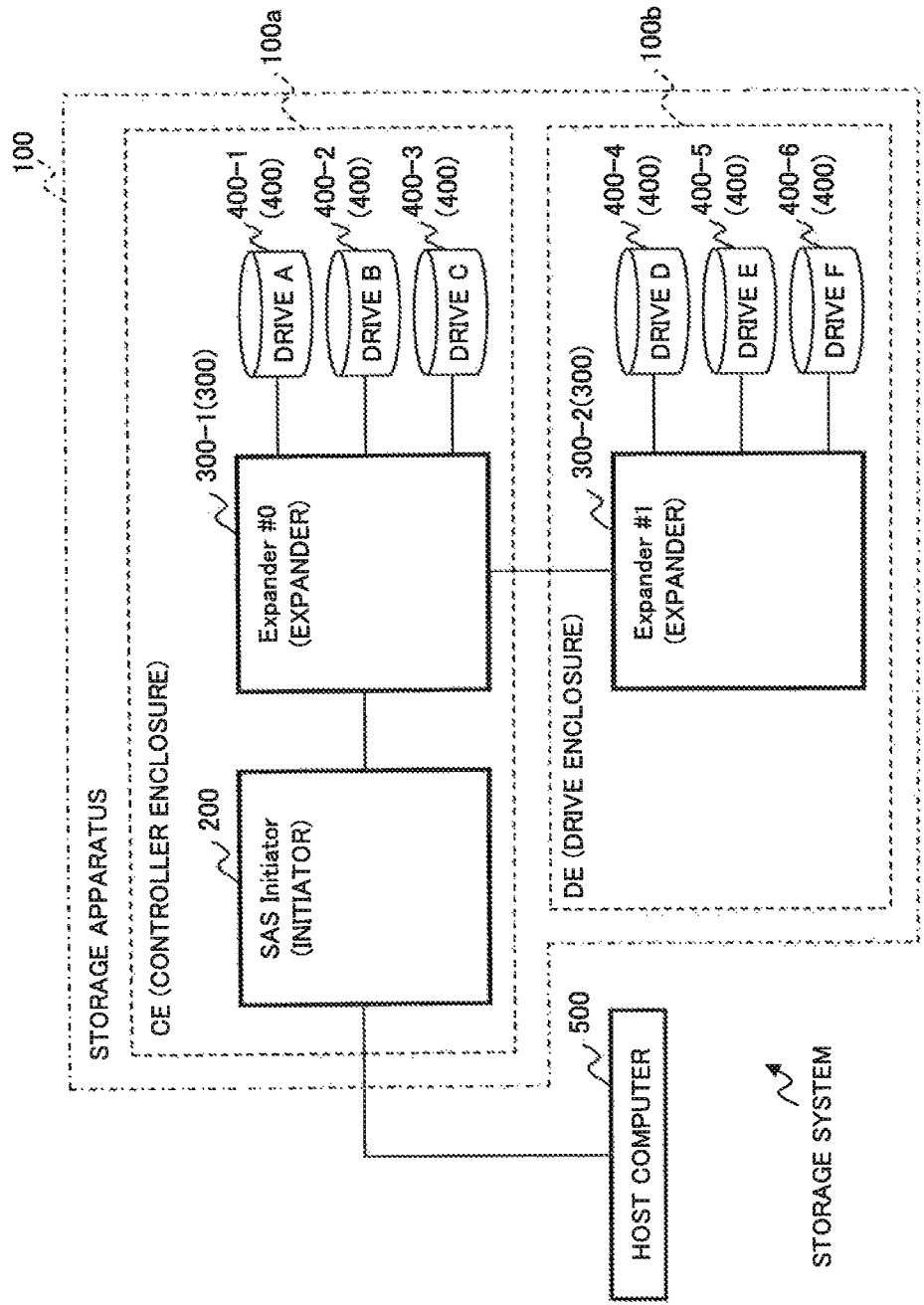
FIG. 10 is a diagram illustrating a configuration example of a storage system.

As illustrated in FIG. 1, the storage system includes a storage apparatus 1 that includes a controller enclosure (CE) 1a and a drive enclosure (DE) 1b, and a host computer 5 similarly to the storage system illustrated in FIG. 10.

The host computer 5 is a device that issues a data access request such as requests to write and read data to and from the SAS drive 4 included in the storage apparatus 1. An information processing apparatus such as a server is an example of the host computer 5.

The CE 1a performs control associated with the data access request issued from the host computer 5 to the drives 4-1 to 4-6, and includes the initiator 2, the expander 3-1, and the drives 4-1 to 4-3.

The DE 1b includes the expander 3-2 and the drives 4-4 to 4-6.

In the following description, the expanders 3-1 and 3-2 will be denoted by reference sign 3 when they are not distinguished from each other, and the drives 4-1 to 4-6 will be denoted by reference sign 4 when they are not distinguished from each other. Further, the drives 4-1 to 4-6 are sometimes referred to as drives A to F, respectively, using the reference signs in FIG. 1. The reference signs A to F represent the SAS addresses of the drives 4, respectively.

The drive (storage unit) 4 is a storage apparatus such as an HDD and an SSD (Solid State Drive) compatible with the SAS standard and is connected to the expander 3.

Figure 11:
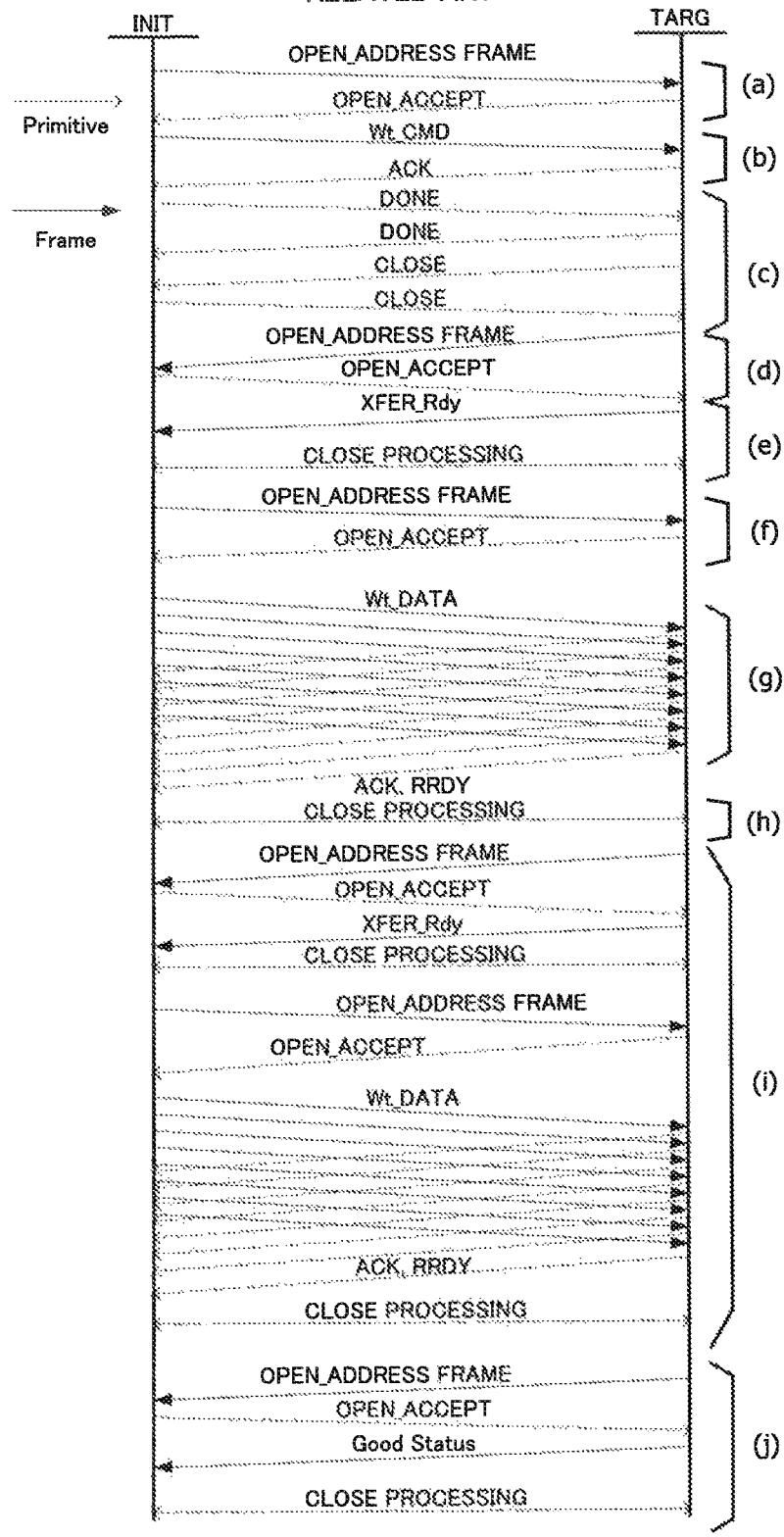
FIG. 11 is a diagram for explaining an example of the sequence of a write command in a SAS protocol.
Figure 12:
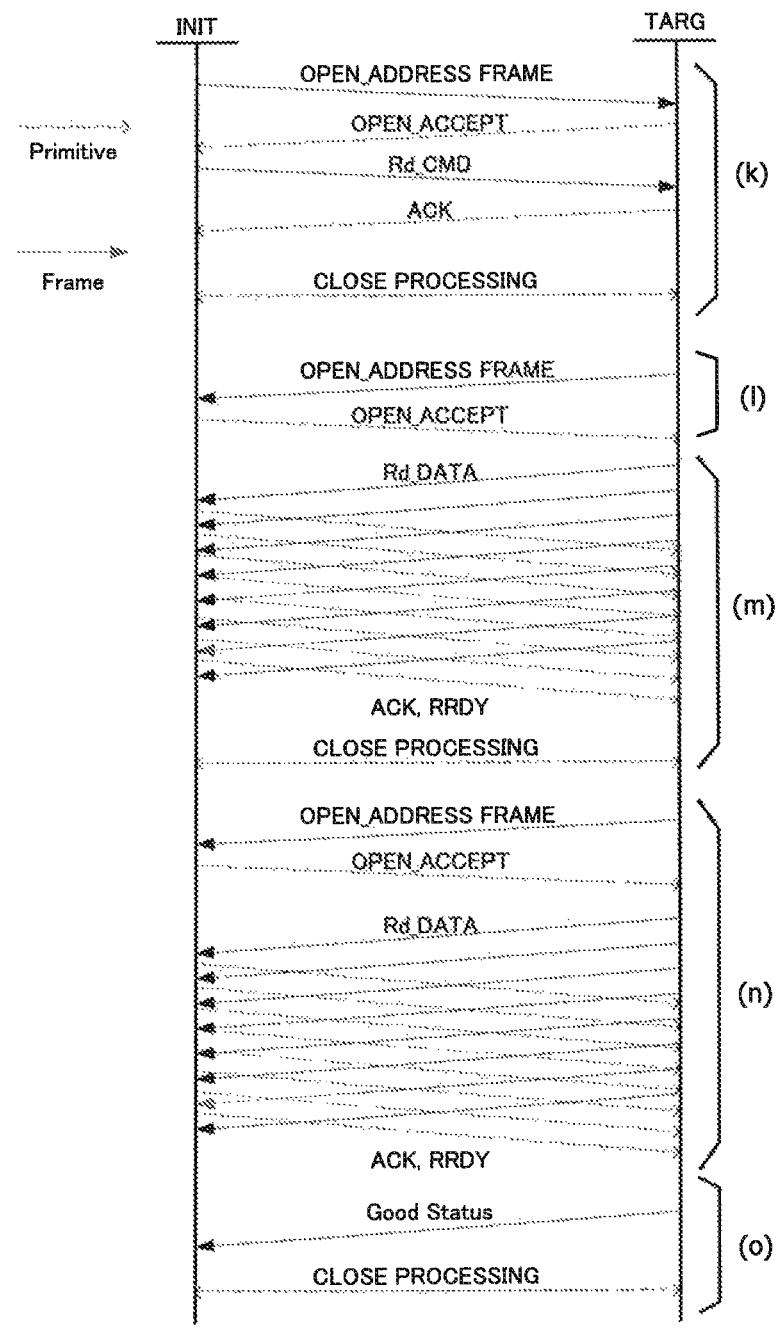
FIG. 12 is a diagram for explaining an example of the sequence of a read command in a SAS protocol.
Figure 13:
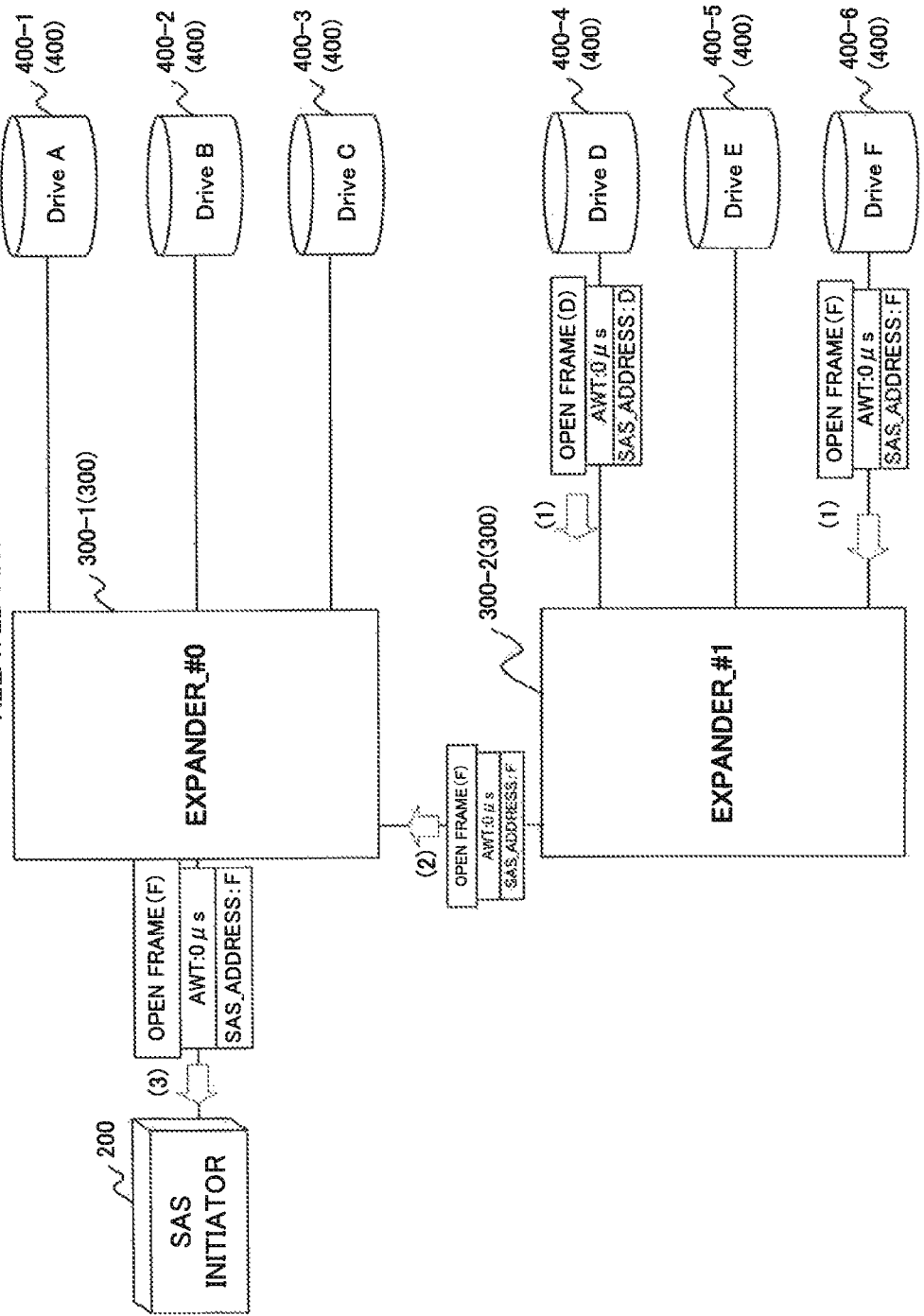
FIG. 13 is a diagram for explaining an example of the sequence of establishing a connection between an initiator and a drive in the storage system illustrated in FIG. 10.
Figure 14:
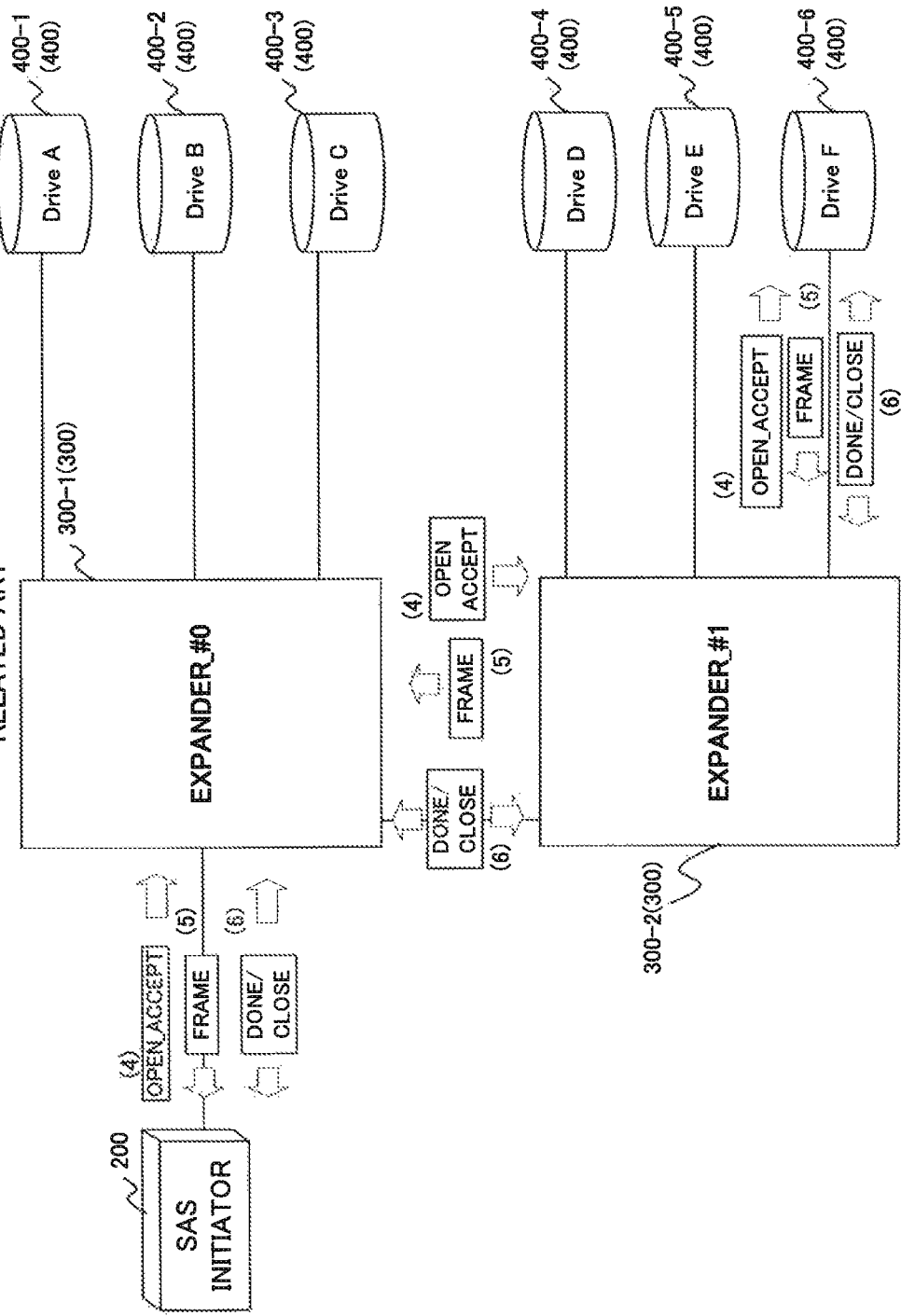
FIG. 14 is a diagram for explaining an example of the sequence of establishing a connection between an initiator and a drive in the storage system illustrated in FIG. 10.
Figure 15:
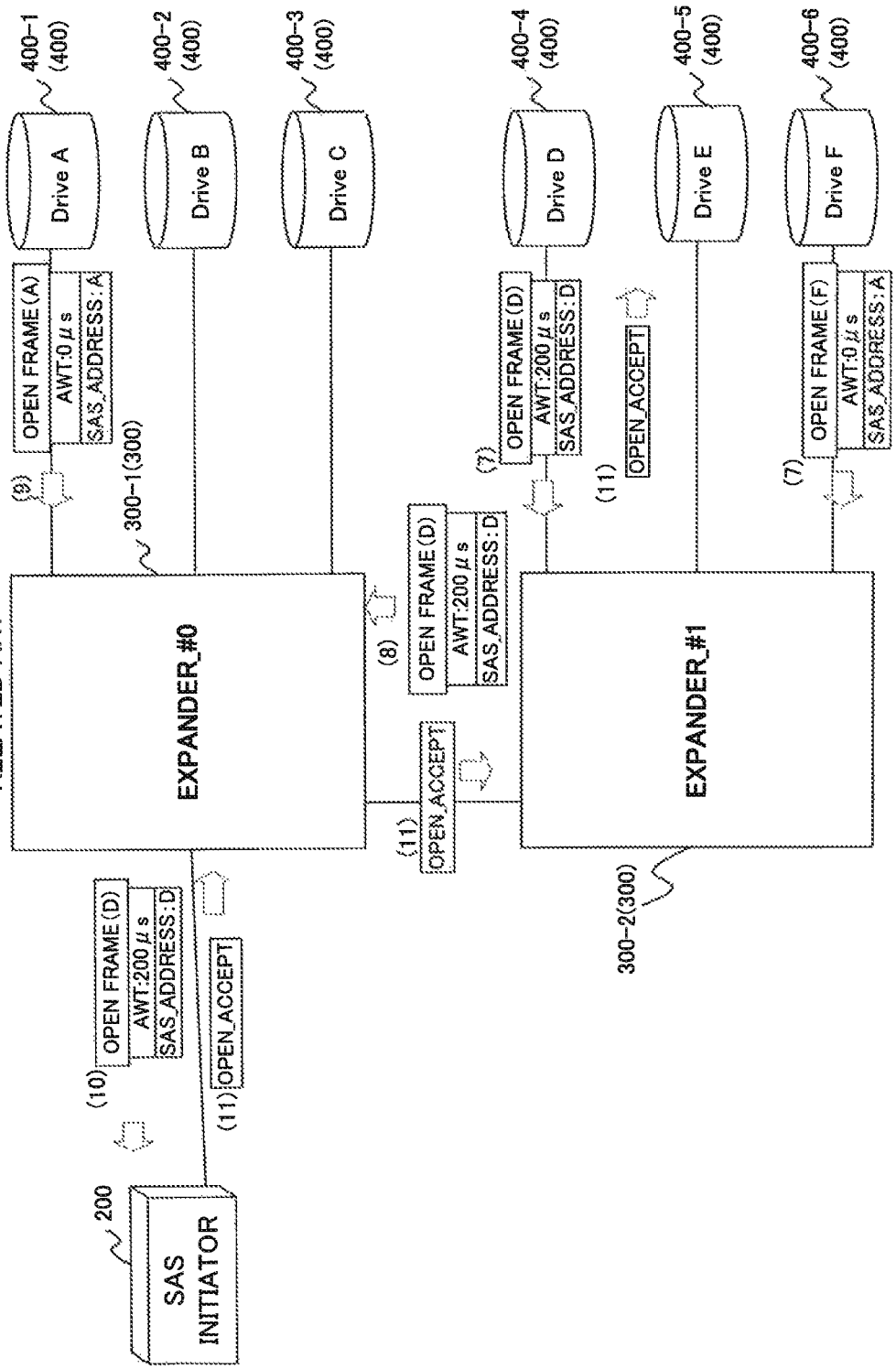
FIG. 15 is a diagram for explaining an example of the sequence of establishing a connection between an initiator and a drive in the storage system illustrated in FIG. 10.
Figure 16:
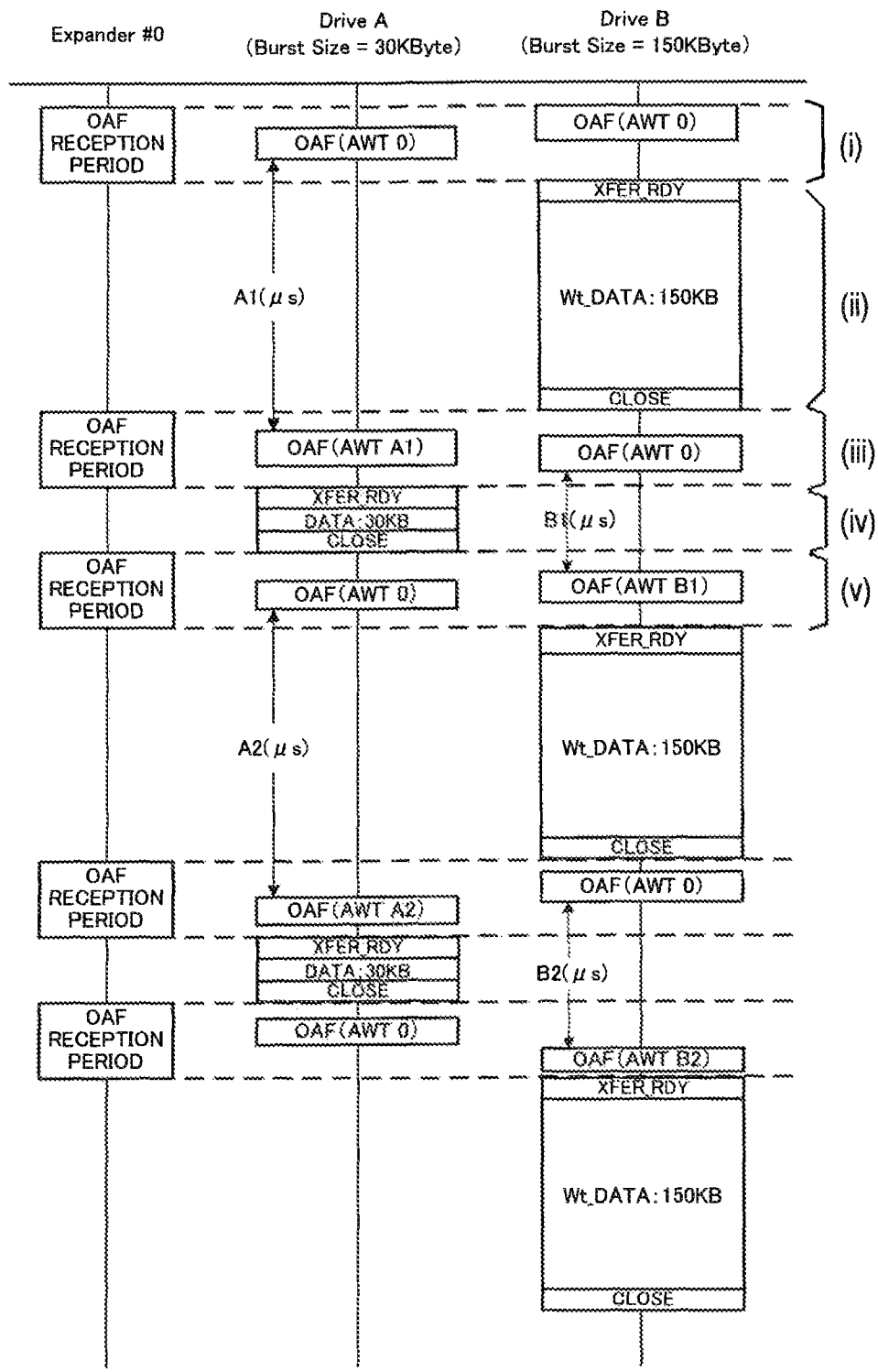
FIG. 16 is a diagram illustrating an example of an operation of transmitting data in a storage system in which a plurality of drives with different burst lengths are present together.

Moreover, the drive 4 transmits and receives data to and from the initiator 2 by establishing connection with the initiator 2 as described above with reference to FIGS. 11 and 12.

Further, in the write sequence, the drive 4 transmits BS by embedding the BS in XFER_Rdy before transmitting write data received from the initiator 2 to thereby receive an amount of write data corresponding to a data amount indicated in the BS from the initiator 2 and stores the write data in a storage area. Moreover, in the read sequence, the drive 4 transmits an amount of read data corresponding to the data amount indicated by the BS from the storage area to the initiator 2.

As described above, the BS is information that represents the size of data that the drive 4 can transmit in one connection, and it is assumed that the drives A to F according to the present embodiment have different BSs.

Moreover, as described above with reference to FIGS. 13 to 16, the drive 4 periodically issues OAF, that is, a connection request, for the initiator 2 when establishing connection. As described above, the OAF includes AWT (priority information) that represents a wait period after the drive 4 requests connection.

(1-2) Description of Initiator

The initiator (controller) 2 is a module that manages the subordinate drives 4-1 to 4-6 and allocates an appropriate drive 4 to the data access request from the host computer 5.

Moreover, the initiator 2 establishes connection (that is, logical connection) with a plurality of drives 4 according to the OAFs (connection requests) issued from the respective drives via the subordinate expander 3-1 or the expanders 3-1 and 3-2 and accesses the drives 4.

The initiator 2 includes a processor 21 and a memory 22.

The processor 21 is a processing device such as a CPU (Central Processing Unit) or an MPU (Micro Processing Unit) that performs various types of control and computation and realizes various functions of the initiator 2 by executing a program stored in ROM (Read Only Memory) that is not illustrated. In the present embodiment, the processor 21 performs execution of processes associated with data access requests issued from the host computer 5 to the drive 4, and the like.

Moreover, the processor 21 according to the present embodiment functions as an acquisition unit 21a and a determining unit 21b.

The acquisition unit 21a acquires property information of each drive 4 corresponding to the property of the subordinate drive 4 of the initiator 2 provided in the storage apparatus 1.

Examples of the property information include the BS of the drive 4, the device information (performance information) of the drive 4, and the like.

The acquisition unit 21a according to the present embodiment acquires the BS of each drive 4 as the property information.

Moreover, the acquisition unit 21a sets the acquired BS of each drive type (drive 4) to the drive type information 22a in the memory 22.

Here, the acquisition unit 21a acquires the BS of a drive type mounted on the storage apparatus 1 at timings when the configuration of the drive 4 can be changed such as "POWER_ON" of the storage apparatus 1 or "active expansion of the drive 4".

The drive types of which the property information (BS) is known in advance can be stored in advance in a predetermined storage area (for example, the memory 22) in correlation with the BS. In this way, when the type of the drive 4 mounted on the storage apparatus 1 is determined, the acquisition unit 21a can acquire the BS of the drive type corresponding to the drive 4 mounted on the storage apparatus 1 from the predetermined storage area.

Moreover, when the BS of part or all of the drive types mounted on the storage apparatus 1 is not stored in the predetermined storage area, that is, when the BS is not known in advance, the acquisition unit 21a acquires BS by reading data from a specific storage area with respect to the drive 4 of which the BS is not known and writing the read data in the same area. That is, the acquisition unit 21a can acquire the BS value included in XFER_Rdy by receiving the XFER_Rdy issued from the drive 4 by performing reading and writing on the specific storage area.

For example, the acquisition unit 21a can read data from an optional address and write the read data to the same address with respect to the drive 4 of which the BS is not known to thereby perform writing without changing the data stored in the drive 4 and acquire BS. The acquisition unit 21a may acquire BS from the drive 4 by writing predetermined data to a specific storage area without performing reading with respect to the drive 4 of which the BS is not known.

When a system configuration of the storage apparatus 1 is changed, the determining unit 21b determines a prescribed successive connection count of each drive type based on the property information (BS) of each drive type acquired by the acquisition unit 21a and sets (updates) the drive type information 22a.

Moreover, the determining unit 21b transmits the determined prescribed successive connection count of each drive type to the expander 3 to which the corresponding drive 4 is connected and sets the prescribed successive connection count in the AWT management table 32a stored in a memory 32 described later of each expander 3.

Here, the prescribed successive connection count is information that represents a threshold value (for example, an upper limit) of the number of times that the drive 4 successively establishes connection with the initiator 2.

A specific method of determining the prescribed successive connection count will be described. When the BS is acquired by the acquisition unit 21a as property information, the determining unit 21b determines (calculates) the prescribed successive connection count based on a drive type having the maximum BS among all drive types. More specifically, the determining unit 21b divides the maximum BS of all drive types by the BS of a drive type of which the prescribed successive connection count is to be calculated and determines the division result (quotient) as the prescribed successive connection count.

The memory (second retention unit) 22 is a storage that temporarily stores various types of data and programs, and is used for temporarily storing and deploying data and programs when the processor 21 executes programs. An example of the memory 22 is volatile memory such as RAM (Random Access Memory).

Moreover, the memory 22 according to the present embodiment stores the drive type information 22a illustrated in FIG. 2 in a predetermined storage area in a table form, for example.

The drive type information (storage unit information) 22a is information in which the property information (BS in FIG. 2) serving as the basis for the classification of drive types acquired by the acquisition unit 21a and the prescribed successive connection count determined by the determining unit 21b are correlated for each drive type. In the present embodiment, as described above, since the respective drives 4 have different BSs, drives A to F are set as drive types. In the example of FIG. 2, the BS is set in Kbyte units.

As illustrated in FIG. 2, the maximum among all drive types is 150 Kbytes which is the BS of the drive B. Thus, the prescribed successive connection counts which are determined by the determining unit 21b and set to the drive type information 22a are as follows.

That is, the prescribed successive connection count of the drive A of which the BS is 30 Kbytes is 150 Kbytes/30 Kbytes=5, and the prescribed successive connection count of the drive B of which the BS is 150 Kbytes is 150 Kbytes/150 Kbytes=1. Similarly, the prescribed successive connection count of the drive C is 150 Kbytes/75 Kbytes=2, and the prescribed successive connection count of the drive D is 150 Kbytes/100 Kbytes=1 (numbers following decimal points are discarded). Moreover, the prescribed successive connection count of the drive E is 150 Kbytes/35 Kbytes=4 (numbers following decimal points are discarded), and the prescribed successive connection count of the drive F is 150 Kbytes/50 Kbytes=3.

Since an integer is set to the prescribed successive connection count, when the computation result includes number following decimal points as in the drives D and E illustrated in FIG. 2, the determining unit 21b performs processing such as discarding or rounding off the numbers following decimal points.

(1-3) Description of Expander

Next, returning to FIG. 1, the expander 3 will be described.

The expander (a connection apparatus, a connection unit, or a first connection unit) 3-1 and the expander (a connection apparatus, a connection unit, or a second connection unit) 3-2 are modules for expanding SAS connection and have the same configuration.

The expander 3 includes the processor 31 and the memory 32 that function as SAS control devices, and also includes a Phy (not illustrated) which is a SAS physical port.

Moreover, the expander 3-1 is connected to the initiator 2, the drives 4-1 to 4-3, and the expander 3-2 in the subordinate DE 1b via the Phy and transmits information such as commands and data associated with the access between the initiator 2 and the access target drive 4.

On the other hand, the expander 3-2 is connected to the expander 3-1 (the initiator 2) and the drives 4-4 to 4-6 via a Phy (physical port) and transmits information associated with the access between the initiator 2 and the access target drive 4.

Hereinafter, detailed configuration of the expanders 3-1 and 3-2 will be described. Since the expanders 3-1 and 3-2 have approximately the same configuration, the same configuration will be described using the expander 3-1 as a representative example.

The processor 31 is a processing device such as a CPU or an MPU that performs various types of control and computation and realizes various functions of the expander 3 by executing a program stored in ROM (not illustrated). In the present embodiment, the processor 31 performs execution of processes on the information associated with access between the initiator 2 and the drive 4, and the like.

Moreover, the processor 31 according to the present embodiment functions as a connection request transmission controller 31a, a changing unit 31b, and a timer 31c.

The connection request transmission controller 31a selects one OAF based on the AWT (priority information) that represents priority associated with connection among a plurality of OAFs (connection requests) received from a plurality of subordinate drives 4 connected to the expander 3. Moreover, the connection request transmission controller 31a transmits the OAF selected based on the AWT to the initiator 2. That is, when access competition occurs between the drives 4, the connection request transmission controller 31a establishes preferentially the connection with the drive 4 that has transmitted the OAF having the greatest AWT among the OAFs according to the SAS protocol.

The connection request transmission controller 31a of the expander 3-2 transmits the OAF selected from the OAFs issued from the drives D to F to the initiator 2 via the expander 3-1. This OAF is arbitrated with the OAFs issued from the drives A to C by the connection request transmission controller 31a of the expander 3-1. That is, the connection request transmission controller 31a of the expander 3-1 transmits the OAF selected based on the AWT among the OAF from the expander 3-2 and the plurality of OAFs from the drives A to C to the initiator 2.

The changing unit 31b changes the AWT included in the OAF received from a certain drive 4 among the plurality of drives 4 so that the AWT has higher priority than the AWTs included in the OAFs received from the other drives 4 for a period where the OAF is successively received from the certain drive 4 and predetermined condition is satisfied.

Specifically, the changing unit 31b changes the AWT associated with the certain drive 4 based on the value of an AWT timer corresponding to the certain drive 4, generated by the timer 31c for a period where the changing unit 31b successively receives the OAF from the certain drive 4 and predetermined condition is satisfied.

Here, the certain drive 4 is a drive 4, of which the connection with the initiator 2 has been established just previously, and is represented by the state of a connection determination flag in the AWT management table 32a described later. Hereinafter, the certain drive 4 is sometimes referred to as a predetermined drive 4.

Moreover, the predetermined condition is a state where the number of times that connection is successively established is smaller than a predetermined number, and is determined based on a prescribed successive connection count and a successive connection count in the AWT management table 32a described later.

The timer (generating unit) 31c generates an AWT timer value (change information) to change the AWT associated with the predetermined drive 4 so that the AWT has higher priority than the AWTs associated with the other drives 4 for the connection request transmission controller 31a.

Here, as described above, the AWT (priority information) is information that represents a wait period after the drive 4 issues the OAF, and the connection request transmission controller 31a selects the OAF including the maximum AWT when a plurality of OAFs is issued.

That is, the timer 31c generates an AWT timer value which is information to change the AWT associated with the predetermined drive 4 so that the AWT has a longer wait period than the wait period associated with the other drives 4 for the connection request transmission controller 31a. Moreover, the changing unit 31b increases the priority of the OAF associated with the predetermined drive 4 by adding the AWT timer value to the AWT associated with the predetermined drive 4.

The timer 31c is a timer corresponding to each of the plurality of drives 4, and generates an AWT timer value that changes with the elapse of time for each drive 4.

The memory (a retention unit or a first retention unit) 32 is a storage device that temporarily stores various types of data and programs and is used for temporarily storing and deploying data and programs when the processor 31 executes a program. An example of the memory 32 is volatile memory such as RAM.

Moreover, the memory 32 according to the present embodiment stores the AWT management table 32a illustrated in FIG. 3 in a predetermined storage area in a table format, for example.

The AWT management table (management information) 32a is information in which a prescribed successive connection count, a successive connection count, an AWT timer, a successive connection request flag, and a connection determination flag are correlated for each drive 4 (Phy ID).

Here, since the expander 3 recognizes the subordinate drive 4 from the Phy ID (port ID) (not illustrated), the information included in the AWT management table 32a is correlated with each Phy ID.

The AWT timer is information in which an AWT timer value that is generated by the timer 31c and counted up always is set to each drive 4 (Phy ID), and is used by the changing unit 31b in such a way that the AWT timer value corresponding to the predetermined drive 4 is referred to. In the example of FIG. 3, the AWT timer value is set in μs units.

The AWT timer value itself generated (counted) by the timer 31c may be set to the AWT timer of the AWT management table 32a, and information for specifying the AWT timer value of each Phy ID generated by the timer 31c may be set to the AWT timer. Hereinafter, these AWT timer values will be collectively referred to simply as an "AWT timer value."

The successive connection request flag (connection request information) is information that represents whether the drive 4 successively issues the OAF. For example, a value "1" that represents a valid state is set to each drive 4 (Phy ID) when the OAF is successively issued, and a value "0" that represents an invalid state is set when the OAF is not successively issued.

The changing unit 31b determines for each drive 4 whether the OAF is received within the OAF reception period (connection request reception period). A value "1" is set to the successive connection request flag when the OAF is received in the period, and a value "0" is set when the OAF is not received in the period.

Moreover, when the successive connection request flag corresponding to the drive 4 that issued the OAF represents the valid state, that is, when the successive connection request flag represents that the OAF is successively issued, the changing unit 31b determines that the drive 4 successively issues the OAF.

The connection determination flag (connection determination information) is information that represents whether connection has been just previously established with the initiator 2. In other words, the connection determination flag is information that represents whether the corresponding drive 4 is the drive 4 of which the connection with the initiator 2 has been just previously established.

For example, a value "1" that represents a valid state is set to the connection determination flag of each drive 4 (Phy ID) when the drive 4 is the drive 4 of which the connection with the initiator 2 has been established just previously, and a value "0" that represents an invalid state is set when the drive 4 is not the drive 4 of which the connection with the initiator 2 has been established just previously.

When the connection between the drive 4 and the initiator 2 is established, the changing unit 31b sets "1" to the connection determination flag corresponding to the drive 4, of which the connection has been established, and sets "0" to the connection determination flag corresponding to the drive 4 of which the connection has not been established.

Moreover, when the connection determination flag corresponding to the drive 4 that issued the OAF represents a valid state, that is, when the connection determination flag represents that the corresponding drive 4 is the drive 4 of which the connection with the initiator 2 has been established just previously, the changing unit 31b determines that the drive 4 that issued this OAF is the predetermined drive 4.

That is, the connection determination flag is used for the changing unit 31b to determine whether the drive 4 that issued the OAF is the predetermined drive 4 and whether the AWT timer value will be added (shifted up).

When the OAF is not received from any of the subordinate drives 4 in the OAF reception period, the changing unit 31b sets, that is, resets (initializes) "0" to all successive connection request flags and all connection determination flags corresponding to the subordinate drives 4.

As described above with reference to FIG. 2, the prescribed successive connection count is information that represents a threshold value of the number of times that the drive 4 is allowed to successively establish connection, and is received from the determining unit 21b of the initiator 2 and set by a changing unit 31b, for example.

The initiator 2 collects and stores the configuration information of the subordinate devices in the storage apparatus 1 in advance and recognizes which drive 4 is connected to which Phy (physical port) of the expander 3. That is, the initiator 2 can identify the drive type connected to each of the expanders 3-1 and 3-2 based on the configuration information together with the corresponding Phy ID.

Thus, the determining unit 21b of the initiator 2 transmits information, in which the Phy ID and the prescribed successive connection count corresponding to the drive type connected to the Phy ID are correlated, to each of the expanders 3-1 and 3-2. In this way, the changing unit 31b of the expander 3 can set the prescribed successive connection count to the AWT management table 32a based on the received information.

The successive connection count is information that represents the number of times that the connection between the drive 4 and the initiator 2 is successively established.

As described above, the expander 3 (the connection request transmission controller 31a) receives the OAFs from the plurality of drives 4 for a predetermined OAF reception period (connection request reception period) when the connection with the drive 4 established by the initiator 2 ends.

That is, the successive connection count is information that represents the number of times that the drive 4 successively acquires connection over a plurality of successive OAF reception periods.

The value of the successive connection count is counted up by the changing unit 31b when connection is established successively between the initiator 2 and the drive 4 that has issued the OAF.

Here, the changing unit 31b determines that the predetermined condition is satisfied when the successive connection count corresponding to the predetermined drive 4 is smaller than the prescribed successive connection count.

That is, the prescribed successive connection count and the successive connection count are used for the changing unit 31b to determine whether the predetermined drive 4 satisfies the predetermined condition.

That is, the changing unit 31b adds an AWT timer value to the AWT associated with the predetermined drive 4 when the expander 3 receives the OAF from the predetermined drive 4 of which the successive connection request flag represents a valid state over a plurality of successive OAF reception periods and the successive connection count corresponding to the predetermined drive 4 is smaller than the prescribed successive connection count.

When the OAF reception period ends, the changing unit 31b updates the AWT management table 32a corresponding to each drive 4.

Specifically, the setting value of the successive connection count is reset (initialized) to "0" by the changing unit 31b when the OAF is not transmitted from the corresponding drive 4, or when the successive connection count is the same as the prescribed successive connection count.

Moreover, the setting value of the AWT timer is reset (initialized) to "0" by the changing unit 31b when the successive connection request flag is "0", or when the successive connection count is the same as the prescribed successive connection count.

Further, the setting value of the successive connection request flag is reset (initialized) to "0" by the changing unit 31b when the OAF is not transmitted from the corresponding drive 4 and is set to "1" when the successive connection request flag is "0" although the OAF is transmitted from the corresponding drive 4.

Here, as described above with reference to FIG. 16, the value of the AWT in the OAF transmitted by the drive 4 is reset to "0" by the drive 4 itself when connection is established. Thus, when drives having different BSs which are the sizes of data that can be transmitted in one connection are present together, there is a problem in that the performance of drives with a small BS (in particular high-performance drives) is degraded greatly as compared to their original performance.

Therefore, in the storage apparatus 1 according to the present embodiment, as for the drive 4 with a small BS, in which connection is to be successively established, the expander 3 adds an AWT timer value to the AWT which generally becomes "0" when the drive 4 acquires connection so that the AWT represents that a substantially long wait period has elapsed. That is, the expander 3 makes the AWT of the OAF from the drive 4 so as not to become "0" for the drive 4 in which connection is to be successively established.

In this way, according to the storage apparatus 1 of the present embodiment, the AWT in the OAF of the drive 4 with a small BS, in which connection is to be successively established is shifted toward the positive side until the successive connection count reaches the prescribed successive connection count, and connection can be acquired preferentially for the drive 4, by the changing unit 31b.

(1-4) Operation Example of Storage Apparatus (1-4-1) Operation Example of Expander Next, an example of a data transmission operation in the storage apparatus 1 (storage system) according to the present embodiment having the above-described configuration will be described with reference to FIGS. 4 and 5.

Figure 4:
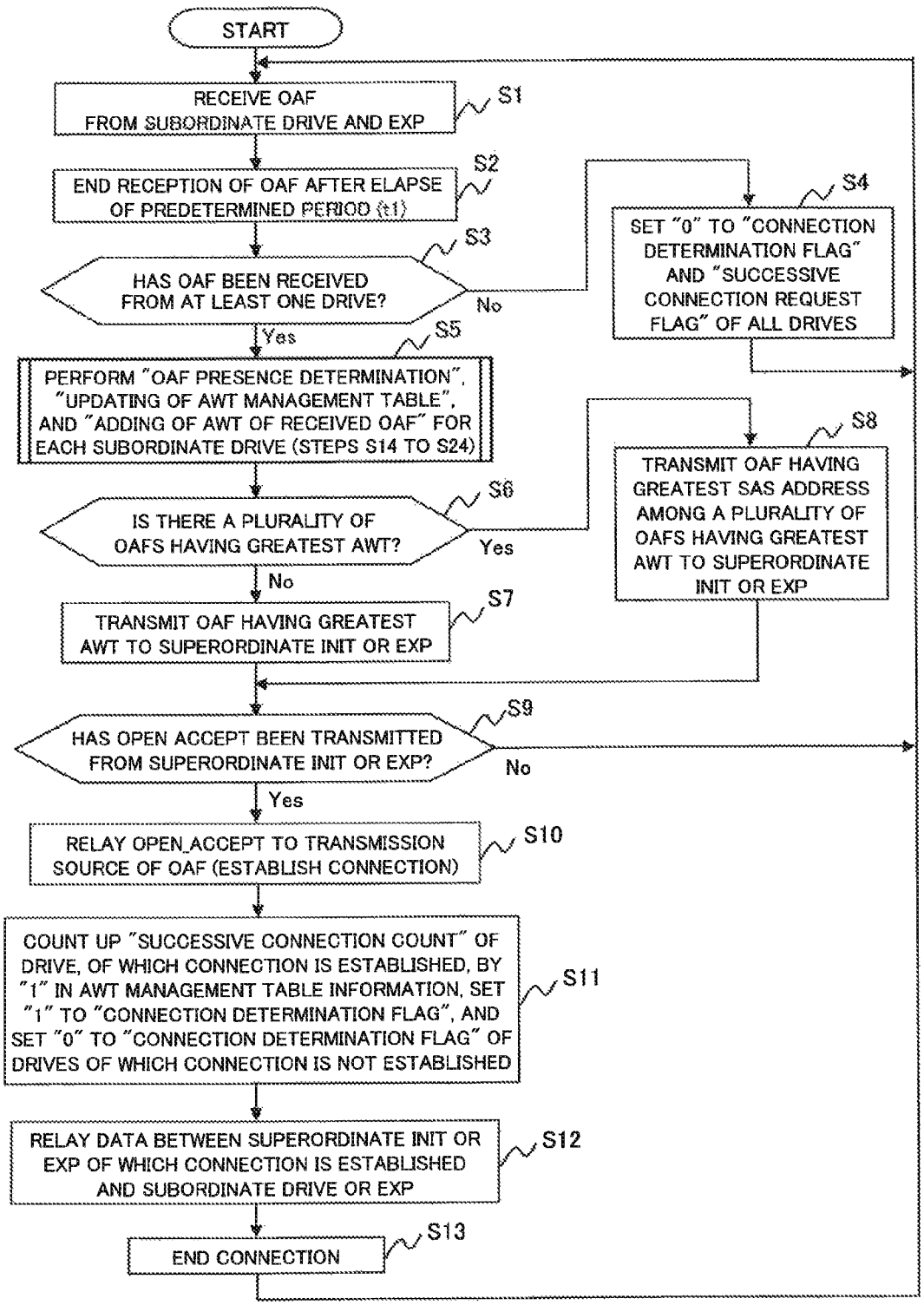
FIG. 4 is a flowchart for explaining an operation example of the expander according to the present embodiment.
Figure 5:
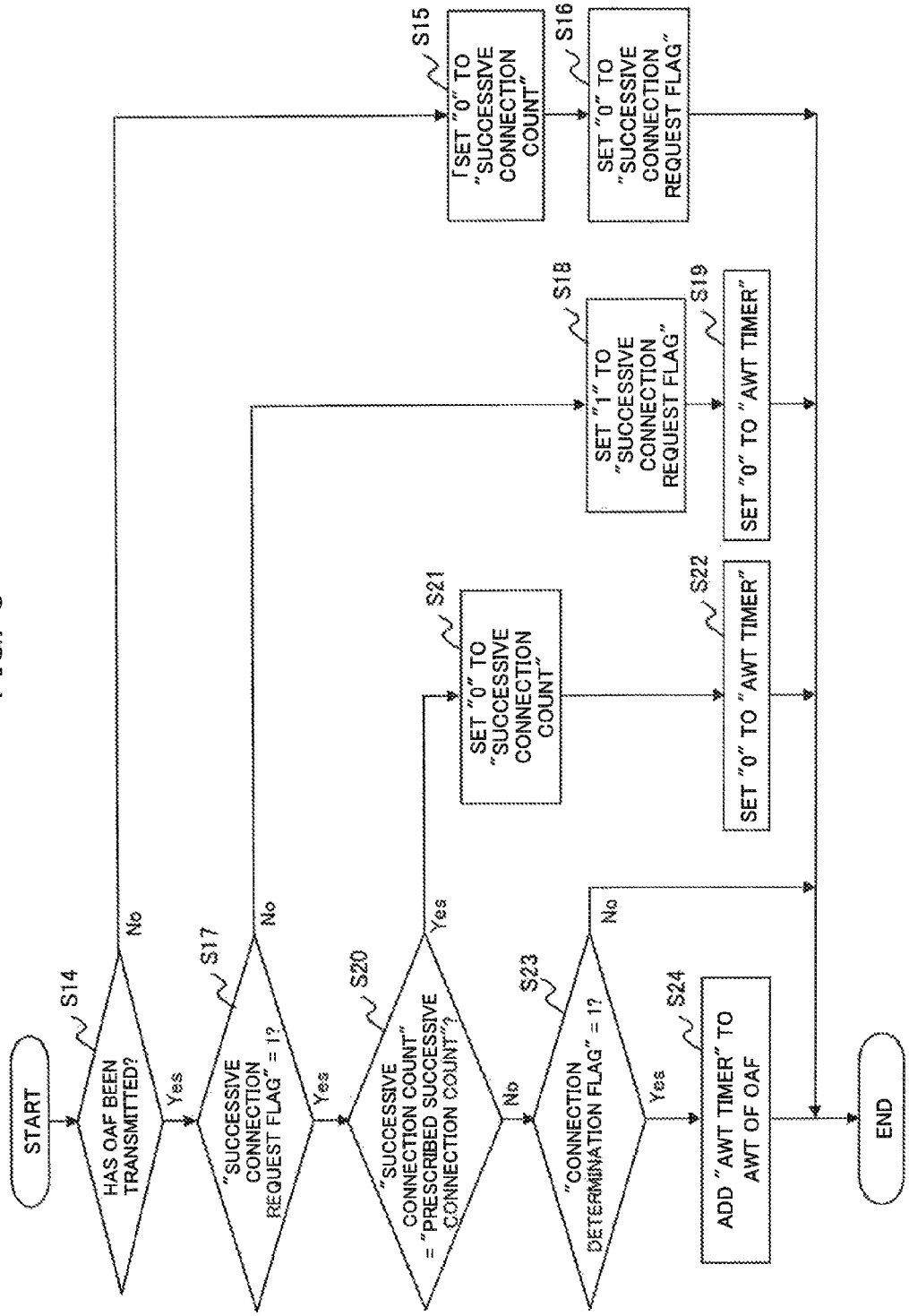
FIG. 5 is a flowchart for explaining an example of an operation of receiving OAF in the expander according to the present embodiment.

FIG. 4 is a flowchart for explaining an operation example of the expander 3 according to the present embodiment, and FIG. 5 is a flowchart for explaining an operation example associated with reception of OAFs in the expander 3.

First, as illustrated in FIG. 4, the expander 3 receives OAFs from the subordinate drives 4 (and the subordinate expander 3) (step S1). The reception of OAFs ends after the elapse of a predetermined period (for example, t1) (step S2; see OAF reception periods (a) to (g) illustrated in FIG. 6).

Subsequently, the expander 3 determines whether there is an OAF received from the respective drives, that is whether an OAF has been received from at least one drive 4 (step S3). When the OAF is not received (No route at step S3), the changing unit 31b sets "0" to the "connection determination flags" and the "successive connection request flags" of all drives 4 (step S4), and the flow proceeds to step S1.

On the other hand, when the OAF is received from at least one drive 4 (Yes route at step S3), the expander 3 performs processes of "OAF presence determination", "updating of the AWT management table 32a", and "adding of the AWTs of received OAFs" for each subordinate drive 4 (step S5).

Specifically, as illustrated in FIG. 5, the changing unit 31b determines for each subordinate drive 4 whether an OAF has been transmitted (step S14).

When it is determined that the OAF has not been transmitted (No route at step S14), the changing unit 31b resets the "successive connection count" of the corresponding drive 4 in the AWT management table 32a to "0" (step S15) and sets "0" to the "successive connection request flag" of the corresponding drive 4 (step S16). In this way, the process of step S5 associated with the corresponding drive 4 ends.

On the other hand, when it is determined in step S14 that the OAF has been transmitted (Yes route at step S14), the changing unit 31b determines whether the "successive connection request flag" of the corresponding drive 4 has a value (for example, "1") that represents a valid state (step S17).

When the "successive connection request flag" is not "1" (No route at step S17), the changing unit 31b sets "1" to the "successive connection request flag" of the corresponding drive 4 (step S18) and resets the "AWT timer value" of the corresponding drive 4 to "0" (step S19). In this way, the process of step S5 associated with the corresponding drive 4 ends.

On the other hand, when it is determined in step S17 that the "successive connection request flag" is "1" (Yes route at step S17), the changing unit 31b determines whether the "successive connection count" of the corresponding drive 4 in the AWT management table 32a is the same as the "prescribed successive connection count" (step S20). With the determination of step S20, the changing unit 31b prevents the AWT from being shifted up more than the predetermined count.

When it is determined in step S20 that the two counts are the same (Yes route at step S20), the changing unit 31b resets the "AWT timer value" of the corresponding drive 4 to "0" (step S21) and sets the "successive connection request flag" of the corresponding drive 4 to "0" (step S22). In this way, the process of step S5 associated with the drive 4 ends.

On the other hand, when it is determined in step S20 that the "successive connection count" and the "prescribed successive connection count" are not the same (No route at step S20), the changing unit 31b determines whether the "connection determination flag" of the corresponding drive 4 has a value (for example, "1") that represents a valid state (step S23).

When it is determined in step S23 that the "connection determination flag" is not "1" (No route at step S23), the changing unit 31b determines that the connection of the corresponding drive 4 is not established, and does not add the "AWT timer value" to the AWT. In this way, the process of step S5 associated with the corresponding drive 4 ends.

On the other hand, when it is determined in step S23 that the "connection determination flag" is "1" (Yes route at step S23), the changing unit 31b adds the "AWT timer value" to the AWT of the OAF issued from the corresponding drive 4 (step S24). In this way, the process of step S5 associated with the corresponding drive 4 ends.

Subsequently, returning to FIG. 4, the connection request transmission controller 31a determines whether there is a plurality of OAFs having the greatest AWT among the OAFs of which the AWTs have been adjusted for each drive 4 in step S5 (step S6).

When there is not a plurality of OAFs having the greatest AWT (No route at step S6), the connection request transmission controller 31a transmits the OAF having the greatest AWT to the superordinate initiator 2 or the superordinate expander 3 (step S7).

On the other hand, when there is a plurality of OAFs having the greatest AWT (step S6: Yes), the connection request transmission controller 31a transmits the OAF transmitted from the drive 4 having the greatest SAS address among the plurality of OAFs having the greatest AWT to the superordinate initiator 2 or the superordinate expander 3 (step S8).

When the connection request transmission controller 31a transmits the OAF to the superordinate device, the expander 3 determines whether OPEN_ACCEPT is transmitted from the superordinate initiator 2 or the superordinate expander 3 in response to the OAF within a predetermined period, for example (step S9).

When the OPEN_ACCEPT is not transmitted (No route at step S9), the flow proceeds to step S1.

On the other hand, when the OPEN_ACCEPT is transmitted (step S9: Yes), the expander 3 relays the OPEN_ACCEPT to a transmission source of the OAF, and connection is established (step S10).

When connection is established in step S10, the changing unit 31b counts up the "successive connection count" in the AWT management table 32a corresponding to the drive 4, of which the connection is established, by "1" and sets "1" to the "connection determination flag." Moreover, "0" is set to the "connection determination flag" in the AWT management table 32a corresponding to the drive 4 of which the connection is not established (step S11).

Moreover, the expander 3 relays data transmitted between the superordinate initiator 2 (or the superordinate expander) of which the connection is established and the subordinate drive 4 or the subordinate expander 3 (step S12). When the connection ends following the end of data transmission (step S13), the flow proceeds to step S1.

Next, an operation example of the expander 3 when an OAF is issued from a plurality of drives 4 in the storage system having the above-described configuration will be described with reference to FIGS. 4 to 6.

Figure 6:
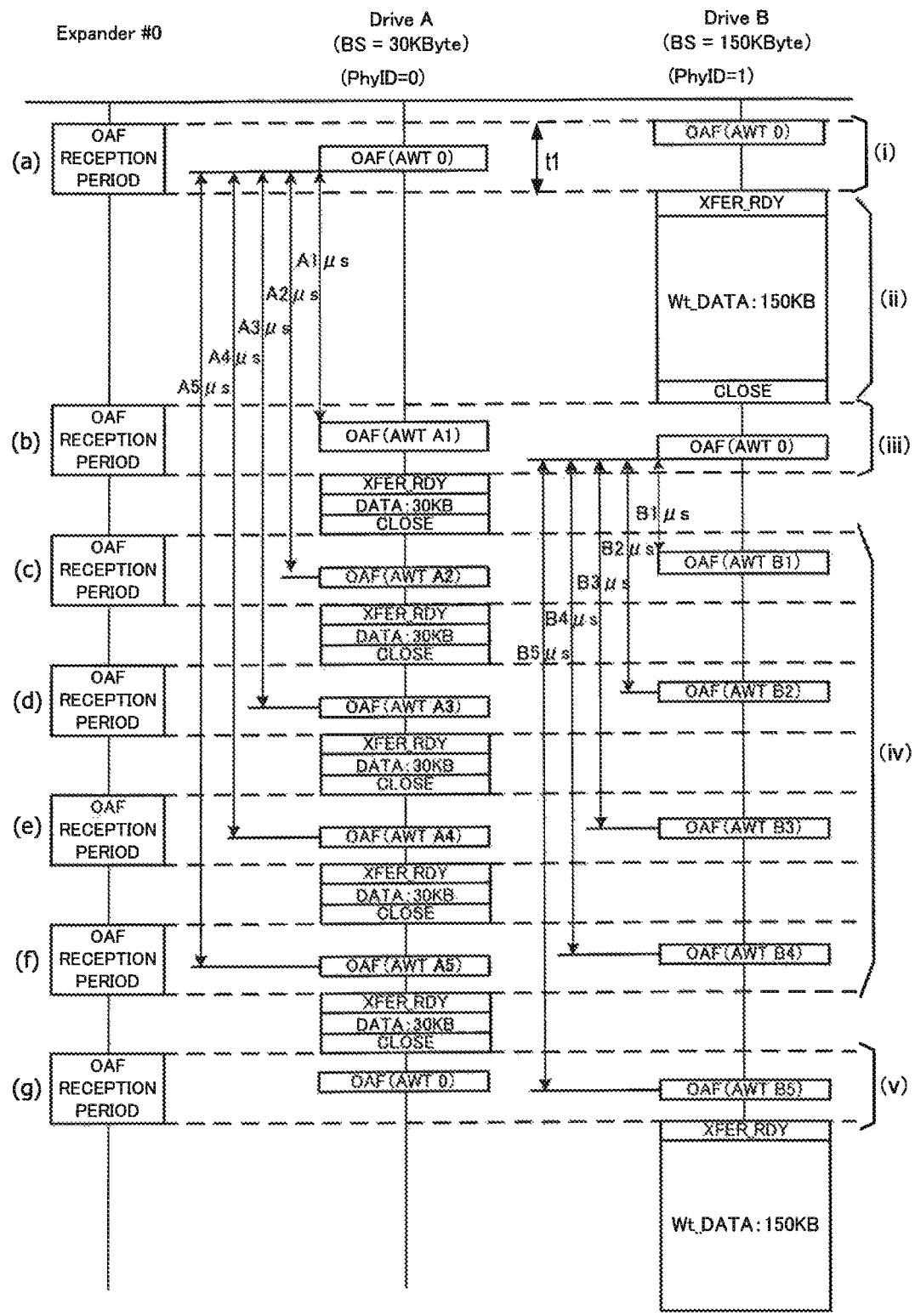
FIG. 6 is a diagram illustrating an example of an operation of transmitting data in a storage system according to the present embodiment.

FIG. 6 is a diagram illustrating an example of a data transmission operation in the storage system according to the present embodiment.

Here, in FIG. 6, a case where drives A and B are respectively connected to Phy IDs="0" and "1" of the expander 3-1, and OAFs are issued from the drives A and B over a plurality of successive OAF reception periods will be described.

Hereinafter, as illustrated in FIG. 6, a case where the BS of the drive A is 30 Kbytes, and the BS of the drive B is 150 Kbytes will be considered. The initial values of the "successive connection count", the "AWT timer" and the "successive connection request flag" of the AWT management table 32a are set to "0."

First, the drives A and B issue OAFs within the OAF reception period of the expander 3-1, and the expander 3-1 ends reception of OAFs (see (a) in FIG. 6).

In this case, in the AWT management table 32a, the changing unit 31b sets "1" to the "successive connection request flag" of the Phy IDs="0" and "1" corresponding to the drives A and B and reset the "AWT timer" to "0" (see steps S18 and S19 of FIG. 5).

For example, when a drive C that does not issue an OAF is connected to the Phy ID="2" of the expander 3-1, in the AWT management table 32a, the changing unit 31b sets "0" to the corresponding "successive connection count" and "successive connection request flag" (see steps S15 and S16 of FIG. 5; the same in (b) to (g) of FIG. 6).

Since the values of the AWTs of the received OAFs of the drives A and B are the same, the connection request transmission controller 31a transmits the OAF of the drive B of which the SAS address is the greater to the initiator 2, and connection is established between the drive B and the initiator 2 (see (i) in FIG. 6).

Subsequently, when the drive B transmits XFER_Rdy including the BS to the initiator 2 via the expander 3-1, the initiator 2 transmits an amount of write data (150 Kbytes) corresponding to the data amount requested in the XFER_Rdy. When transmission is completed, the initiator 2 closes the connection (see (ii) in FIG. 6). The changing unit 31b counts up the "successive connection count" corresponding to the drive B to become "1" and sets "1" to the "connection determination flag." Moreover, "0" is set to the "connection determination flag" corresponding to the drive A (see step S11 of FIG. 4).

Since the connection is closed, the expander 3-1 can receive OAF again. In this case, the drive A issues OAF, in which a wait period (A1 µs) from the previous OAF is set to AWT, and the drive B issues OAF in which a wait period (0 µs) is set to AWT (see (b) in FIG. 6).

In this case, since the "connection determination flag" corresponding to the drive A is "0", the AWT management table 32*a* is not changed except for the setting value of the "AWT timer" which is constantly counted up by the AWT timer value (see the No route at step S23 of FIG. 5). On the other hand, since the "successive connection count" corresponding to the drive B is the same as the "prescribed successive connection count" and is "1", the changing unit 31*b* resets the "successive connection count" and the "AWT timer" to "0" (see steps S21 and S22 of FIG. 5).

The connection request transmission controller 31*a* transmits the OAF of the drive A, of which the value of the AWT of the received OAF is the larger, to the initiator 2, and connection is established between the drive A and the initiator 2 (see (iii) in FIG. 6). Moreover, in response to the transmission of the XFER_Rdy from the drive A, the write data (30 Kbytes) is transmitted from the initiator 2, and the connection is closed (see (iii) in FIG. 6). The changing unit 31*b* counts up the "successive connection count" corresponding to the drive A to become "1" and sets "1" to the "connection determination flag." On the other hand, "0" is set to the "connection determination flag" of the drive B (see step S11 of FIG. 4).

When the connection is closed, the expander 3-1 can receive OAF again. In this case, the drive A issues OAF, in which a wait period (0 µs) is set to AWT, and the drive B issues OAF in which a wait period (B1 µs) from the previous OAF is set to AWT (see (c) in FIG. 6).

In this case, in the AWT management table 32*a*, since the "successive connection count" corresponding to the drive A is "1" that is smaller than the "prescribed successive connection count", and the "connection determination flag" is "1", the changing unit 31*b* adds the AWT timer value "A2" counted up from (a) in FIG. 6 to the AWT of the OAF of the drive A (see step S24 of FIG. 5). On the other hand, since the "connection determination flag" corresponding to the drive B is "0", the AWT management table 32*a* is not changed except for the setting value of the "AWT timer" which is constantly counted up by the AWT timer value (see the No route at step S23 of FIG. 5).

That is, the changing unit 31*b* adds "A2 µs" to the AWT of the drive A having a small BS to shift up the AWT so that the AWT corresponding to a case where the connection in (b) of FIG. 6 is not established is intentionally set to the OAF of the drive A.

Moreover, the changing unit 31*b* compares the AWT "A2 µs" of the drive A and the AWT "B1 µs" of the drive B and establishes the connection of the OAF of the drive A having the greater AWT. The drive A of which the connection is established transmits XFER_Rdy and then receives write data (30 Kbytes), and the connection is closed.

Similarly to (c) of FIG. 6, the drive A issues an OAF in which an AWT "0 µs" is set over a plurality of successive OAF reception periods (d) to (f). Moreover, the changing unit 31*b* adds the value of the "AWT timer" corresponding to the drive A to the AWT of the OAF and counts up the "successive connection count" when the connection is established (see (iv) in FIG. 6).

As illustrated in FIGS. 5 and 6, the changing unit 31*b* repeatedly shifts up the AWT of the drive A to successively establish the connection five times. In this way, the BS of the drive A can be intentionally made to be "150 Kbytes" which is the BS of the drive B.

In the OAF reception period (g), since the connection of the drive A is established a number of times (5 times) that the BS is equalized, the changing unit 31*b* ends the shifting up of the drive A. That is, the connection of the drive A is established in (f) of FIG. 6, and the "successive connection count" is counted up to "5" (see step S11 of FIG. 4). Thus, in the AWT management table 32*a* after the elapse of the OAF reception period (g), since the "successive connection count" corresponding to the drive A is the same as the "prescribed successive connection count" and is "5", the changing unit 31*b* resets the "successive connection count" and the "AWT timer" of the drive A to "0" (see steps S21 and S22 of FIG. 5).

Moreover, the connection request transmission controller 31*a* transmits the OAF of the drive B, of which the value of the AWT of the received OAF is the larger, to the initiator 2, and connection is established between the drive B and the initiator 2 (see (v) in FIG. 6).

As described above, the expander 3 intentionally shifts up the AWT based on the count corresponding to the property information (for example, the BS) for each drive 4. In this way, it is possible to prevent degradation of the performance of the storage apparatus 1 (the drive 4) with a small BS.

In the description made with reference to FIGS. 5 and 6, although the expander 3-1 has been focused on, the same is applied to the expander 3-2 which is connected to the expander 3-1 and has the same configuration as the connection request transmission controller 31*a*, the changing unit 31*b*, the timer 31*c*, and the memory 32 of the expander 3-1.

That is, the connection request transmission controller 31*a* of the expander 3-1 selects one OAF based on the AWTs included in a plurality of OAFs received from a plurality of drives 4-1 to 4-3 and the AWT included in the OAF received from the connection request transmission controller 31*a* of the expander 3-2 and transmits the selected OAF to the initiator 2. More specifically, when the subordinate drive (predetermined drive) 4 of the expander 3-2 successively acquires connection, the connection request transmission controller 31*a* of the expander 3-1 receives the OAF including the AWT in which the AWT timer is added (changed) by the changing unit 31*b* of the expander 3-2.

Thus, the expander 3-1 directly connected to the initiator 2 adjusts (arbitrates) the OAF from the subordinate drive 4 and the OAF including the changed AWT from the subordinate expander 3-2 and transmits the OAF selected as the result of the adjustment (arbitration) to the initiator 2.

(1-4-2) Operation Example of Initiator

Next, a process of setting the prescribed successive connection count of the expander 3 by the initiator 2 (the determining unit 21*b*) will be described with reference to FIGS. 7 and 8.

As described above, when the system configuration of the storage apparatus 1 during system power-on or active expansion, and the property information (for example, the BS) of the drive type connected to the subordinate expander 3 is known in advance, the determining unit 21*b* calculates a prescribed successive connection count and sets the prescribed successive connection count as the prescribed successive connection count of the AWT management table 32*a* of the expander 3.

Hereinafter, the process of the initiator 2 when the property information of part or all of the drive types connected to the subordinate expander 3 is not known in advance will be described.

Figure 7:
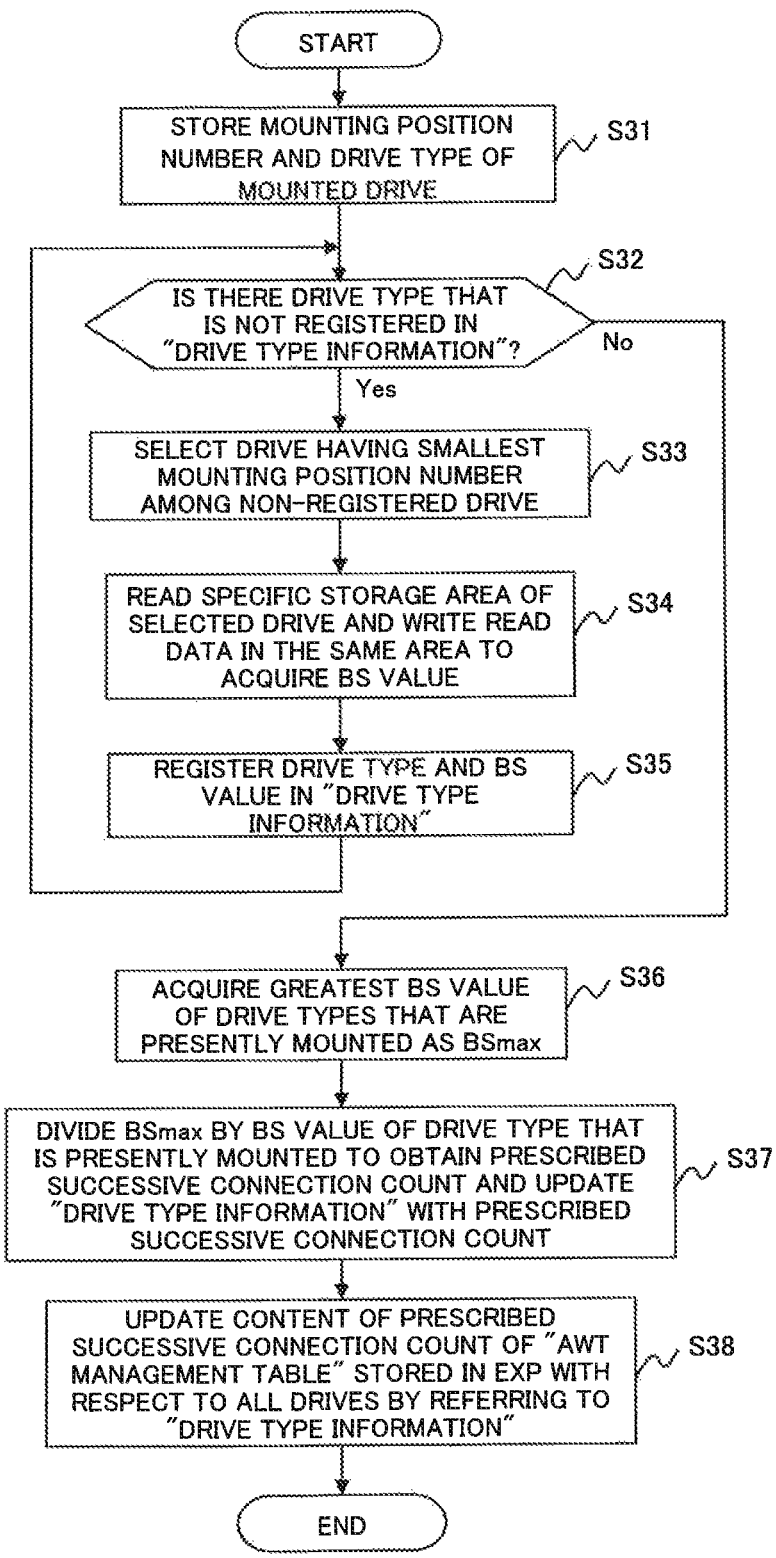
Figure 8:
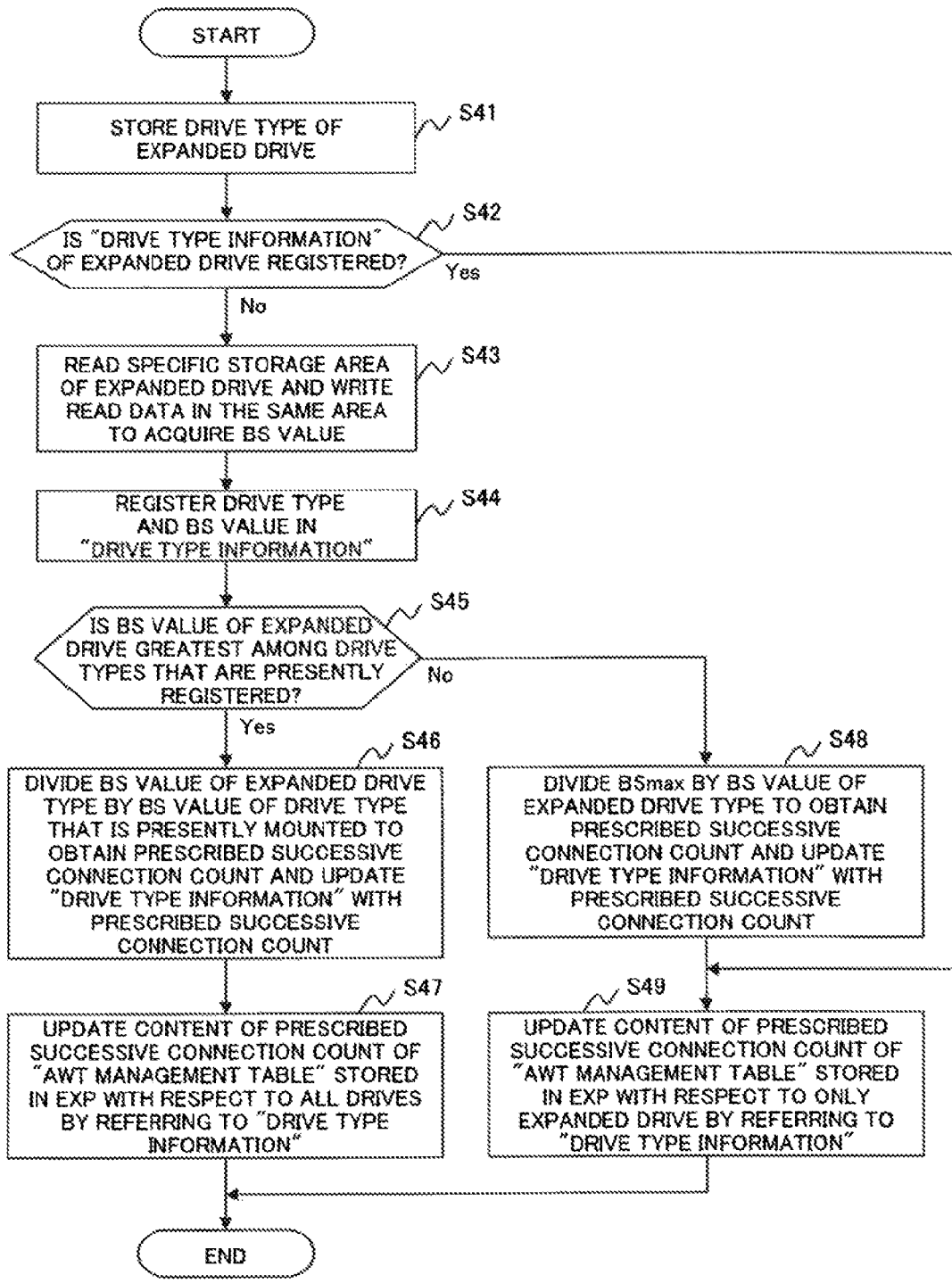
FIG. 8 is a flowchart for explaining an example of an operation of setting a prescribed successive connection count of the initiator according to the present embodiment when performance information of drives is not known during active expansion.

FIG. 7 is a flowchart for explaining an example of an operation of setting a prescribed successive connection count by the initiator 2 according to the present embodiment when performance information of drives is not known during system power-on. Moreover, FIG. 8 is a flowchart for explaining an example of an operation of setting a prescribed successive connection count by the initiator 2 according to the present embodiment when performance information of drives is not known during active expansion.

First, an example of an operation of setting a prescribed successive connection count according to the present embodiment when performance information of drives is not known during system power-on will be described. As illustrated in FIG. 7, the initiator 2 stores a mounting position number and a drive type of the mounted drive 4 in the memory 22 (step S31). The mounting position number may be a combination of a number for specifying the expander 3 and the Phy ID of the expander. For example, the mounting position number of a drive mounted on the Phy ID="2" of the expander 3-1 may be "0102."

Subsequently, the initiator 2 determines whether there is a drive type that is not registered in the drive type information 22*a* (step S32).

When there is a drive type that is not registered in the drive type information 22*a* (No route at step S32), the acquisition unit 21*a* selects the drive 4 of which the mounting position number is the smallest among the drives 4 that are not registered (step S33).

Moreover, the acquisition unit 21*a* reads a specific storage area of the selected drive 4 and writes the read data in the same area to thereby acquire the BS value (step S34).

When the BS value is acquired, the acquisition unit 21*a* registers the drive type and the BS value in the drive type information 22*a* (step S35) and determines whether there is another drive type that is not registered in the drive type information 22*a* (step S32).

On the other hand, when it is determined in step S32 that there is not a drive type that is not registered in the drive type information 22*a* (No route at step S32), the determining unit 21*b* acquires the greatest BS value among the drive types that are presently mounted on the subordinate expander 3 as BSmax (step S36).

Moreover, the determining unit 21*b* divides the BSmax by the BS value of each of the drive types mounted on the subordinate expander 3 to obtain the prescribed successive connection count corresponding to each of the drive types. Moreover, the prescribed successive connection count is set to the drive type information 22*a* (that is, the drive type information 22*a* is updated) (step S37). As described above, when the result of the division of the BSmax by the BS value includes numbers following decimal points, the numbers are discarded or rounded off.

Finally, the determining unit 21*b* updates the contents of the prescribed successive connection count of the AWT management table 32*a* of the expander 3 with respect to all drive types (drives 4) by referring to the drive type information 22*a* (and the mounting position number) (step S38).

Next, an example of an operation of setting a prescribed successive connection count according to the present embodiment when performance information of drives is not known during active expansion will be described. As illustrated in FIG. 8, the initiator 2 stores a mounting position number and a drive type of the drive 4 that is actively expanded in the memory 22 (step S41).

Subsequently, the initiator 2 determines whether a drive type of the drive 4 that is actively expanded is registered in the drive type information 22*a* (step S42).

When the drive type is not registered in the drive type information 22*a* (No route at step S42), the acquisition unit 21*a* reads a specific storage area of the actively expanded drive 4 and writes the read data in the same area to thereby acquire the BS value (step S43).

When the BS value is acquired, the determining unit 21*b* registers the drive type and the BS value in the drive type information 22*a* (step S44) and determines whether the BS value of the expanded drive 4 is the greatest among the drive types registered in the drive type information 22*a* (step S45).

When the BS value is determined to be the greatest (Yes route at step S45), the determining unit 21*b* divides the BS value of the expanded drive type by the BS value of each of the drive types mounted on the subordinate expander 3 to obtain the prescribed successive connection count corresponding to each of the drive types. Moreover, the prescribed successive connection count is set to the drive type information 22*a* (that is, the drive type information 22*a* is updated) (step S46). As described above, when the result of the division of the BS value of the expanded drive type by the BS value includes numbers following decimal points, the numbers are discarded or rounded off.

Finally, the determining unit 21*b* updates the contents of the prescribed successive connection count of the AWT management table 32*a* of the expander 3 with respect to all drive types (drives 4) by referring to the drive type information 22*a* (and the mounting position number) (step S47).

On the other hand, it is determined in step S45 that the BS value of the expanded drive type is not the greatest among the drive types that are presently registered in the drive type information 22*a* (No route at step S45), the determining unit 21*b* divides the BSmax calculated in advance by the BS value of the expanded drive type to obtain the corresponding prescribed successive connection count. Moreover, the prescribed successive connection count is set to the drive type information 22*a* (step S48).

Moreover, the determining unit 21*b* updates the contents of the prescribed successive connection count of the AWT management table 32*a* of the expander 3 with respect to only the expanded drive type (drive 4) by referring to the drive type information 22*a* (and the mounting position number) (step S49).

When it is determined in step S42 that the actively expanded drive 4 is registered in the drive type information 22*a* (Yes route at step S42), the flow proceeds to step S49.

As described above, even when the property information of part or all of the drive types connected to the subordinate expander 3 is not known, the initiator 2 can acquire the property information of each of the drive types and set the prescribed successive connection count.

As described above, according to the expander 3 of the present embodiment, the AWT (priority information) included in the OAF received from a certain drive 4 among a plurality of drives 4 is changed so that the AWT has higher priority than the AWTs included in the OAFs received from the other drive 4 for a period where the OAF (connection request) is successively received from the certain drive 4 and a predetermined condition is satisfied.

In this way, by increasing the priority of the connection of the drive 4 of which the property information (for example, the BS) is small, for example, it is possible to suppress degradation of the performance of a storage apparatus in which a plurality of storage units having different performance are present together.

Moreover, when the function according to the present embodiment is integrated into the expander 3, since it is not necessary to change the interface of the drive 4 with a minimal change (only in the expander 3) of the existing system configuration, it is possible to suppress an increase of the cost.

More specifically, according to the expander 3 of the present embodiment, the AWT management table 32a in which the successive connection count and the prescribed successive connection count are correlated for each drive 4 is stored in the memory 32, and the changing unit 31b determines that the predetermined condition is satisfied when the successive connection count corresponding to the predetermined drive 4 is smaller than the prescribed successive connection count. That is, the AWT is changed so that the priority of the corresponding drive 4 is increased for a period where the OAF is successively received from the predetermined drive 4 and the predetermined condition is satisfied.

Thus, by only changing the AWT so that the priority of the drive 4 is increased, it is possible to establish connection successively for a period where the predetermined condition is satisfied, and to prevent degradation of the performance of the drive 4 with a small BS.

Moreover, the expander 3 of the present embodiment includes the timer 31c that generates the AWT timer (change information) to change the AWT associated with the predetermined drive 4 so that the AWT has higher priority than the AWTs of the other drives 4 for the connection request transmission controller 31a.

Thus, the expander 3 can shift the value of the AWT of the OAF of the drive 4, in which the priority of the connection is to be increased, toward the positive side, establish connection successively predetermined number of times set for each drive type, and prevent degradation of the performance of the drive 4.

In a storage system, in the write sequence according to the SAS protocol, even when the same MBS (Maximum Burst Size) value (for example, 160 Kbytes) is set in advance for each drive 4, there is a case where the BS value included in the XFER_Rdy transmitted from the drive 4 has a small value (for example, 32 Kbytes).

A case where first to third drives 4 are under the same initiator 2, the first and second drives 4 are HDDs of which the BS values are 160 Kbytes that is the same as the MBS value, and the third drive 4 is a SSD of which the BS value is 32 Kbytes that is smaller than the MBS value will be considered. In this case, when the connection settings for the three drives 4 compete each other, the access of the SSD which is the third drive 4 has to wait until access corresponding to 160 Kbytes×2 ends, and the performance of the SSD is remarkably degraded.

According to the expander 3 of the present embodiment, in the above case, that is, even when the BS value is smaller than the MBS value, the SSD which is the third drive 4 can establish connection successively for a period corresponding to the prescribed successive connection count (160 Kbytes/32 Kbytes=5) once the SSD acquires connection.

Moreover, according to the expander 3 of the present embodiment, determination and control associated with the selection of the OAF of which the connection is to be established is performed according to a relative relationship of the respective drives 4 based on the two known setting values of the BS which is the property information and the AWT which is the priority information.

Thus, it is not necessary to change settings for tuning priority values manually whenever the configuration of devices on a bus is changed with an increase and a decrease in the number of devices. Moreover, even when the system configuration of the storage apparatus 1 is changed, it is possible to flexibly perform control automatically in accordance with the changed configuration.

Further, according to the expander 3 of the present embodiment, the connection determination flag (connection determination information) is further stored in the AWT management table 32a of the memory 32 in correlation with each drive 4. Moreover, when the connection determination flag corresponding to the drive 4 that issued the OAF is in a valid state, the changing unit 31b determines that the drive 4 that issued the OAF is the predetermined drive 4, that is, the drive 4 of which the AWT is to be shifted toward the positive side.

Thus, it is possible to reliably establish connection for the drive 4 that has just previously established connection with the initiator 2 for a period where the predetermined condition is satisfied.

Moreover, the initiator 2 according to the present embodiment includes the acquisition unit 21a that acquires the property information (BS) corresponding to the property of the drive 4 for each drive 4 and the determining unit 21b that determines the prescribed successive connection count for each drive 4 based on a plurality of items of property information and transmits the prescribed successive connection count to the expander 3.

In this way, the expander 3 can reliably acquire the prescribed successive connection count of each drive 4 corresponding to the system configuration of the storage apparatus 1.

Moreover, in the initiator 2, the drive type information (the storage unit information) 22a in which the property information and the prescribed successive connection count are correlated for each drive 4 is stored in the memory 22, and the drive type information 22a is updated when the system configuration of the storage apparatus 1 is changed.

Thus, even when the system configuration is changed, it is possible to flexibly update the setting value automatically in accordance with the changed configuration.

(2) Modification Example

In the above-described embodiment, although the initiator 2 (the determining unit 21b) has determined the prescribed successive connection count using the information on the BS used as the property information corresponding to the property of the drive 4, the present invention is not limited to this.

For example, the prescribed successive connection count may be determined using the performance information corresponding to the property of the drive 4 as the property information according to this modification example. That is, in this modification example, the priority of the device may be determined taking a performance difference of the devices (drives 4) into consideration.

That is, in the embodiment, the priority (that is, the prescribed successive connection count) of the drive 4 having a small BS has been increased so that the amount of data transmitted successively is equalized to the amount of data transmitted in one connection by the other drives 4 having a large BS.

On the other hand, by increasing the priority (the prescribed successive connection count) of the drive 4 having high performance in terms of a data transmission rate and a seek time, it is possible to improve the overall performance of the storage apparatus 1.

Hereinafter, a case of using the performance information as the property information will be described with reference to FIG. 9.

FIG. 9 is a diagram illustrating the drive type information 22b stored by the initiator 2 according to the modification example of the present embodiment.

Since the configurations other than the acquisition unit 21a, the determining unit 21b, and the drive type information 22b of the initiator 2 are the same or approximately the same as those of the storage apparatus 1 according to the embodiment illustrated in FIG. 1, redundant description thereof will not be provided.

Hereinafter, the performance means a data transmission rate and a seek time.

The initiator 2 (the determining unit 21b) according to this modification example determines the priority (the prescribed successive connection count) using a "drive type" such as an HDD or an SSD and device information (performance information) such as a "disc rotation speed", which are related to the performance of the drive 4 as a determination material.

For example, as illustrated in FIG. 9, the acquisition unit 21a performs classification corresponding to the performance information with respect to the drives 4 mounted on the storage apparatus 1. For example, the acquisition unit 21a acquires information such as "SSD", "HDD of 7.2 Krpm (revolution per minute)", and "HDD of 15 Krpm".

The initiator 2 (the determining unit 21b) determines these items of performance information comprehensively and arranges these items of performance information in descending order of performance. For example, these items of performance information are arranged in the order of "SSD", "HDD of 15 Krpm", and "HDD of 7.2 Krpm".

Moreover, the determining unit 21b determines the prescribed successive connection count so as to increase in descending order of the performance based on the relationship between the "drive type" and the "disc rotation speed".

As an example, as illustrated in FIG. 9, the prescribed successive connection count is determined to be 3 for "SSD", 2 for "HDD of 15 Krpm" and 1 for "HDD of 7.2 Krpm".

As described above, by determining the prescribed successive connection count based on the performance information used as the property information, it is possible to obtain the same advantages as those described in the embodiment. Moreover, by increasing the prescribed successive connection count of the drive 4 having higher performance information among the drives having the same BS, it is possible to further improve the overall performance of the storage apparatus 1.

The acquisition unit 21a may acquire both the BS according to the embodiment and the performance information according to this modification example as the property information. Moreover, the determining unit 21b may determine the prescribed successive connection counts corresponding to the respective drives 4 by taking both the BS and the performance information into consideration, between the plurality of drives 4.

(3) Others

While the preferred embodiments of the present invention have been described hereinabove, the present invention is not limited to the specific embodiments, but various modifications and changes can be made without departing from the spirit of the present invention.

For example, the function of the timer 31c included in the expander 3 according to the embodiment and the modification example described above may not be included in the processor 31 but may be realized by another device.

Moreover, the AWT timer may not be included in the AWT management table 32a, and the changing unit 31b may acquire the AWT timer value directly from the timer 31c.

Further, in the embodiment and the modification example described above, although the changing unit 31b has added the AWT timer value generated by the timer 31c to the AWT of the OAF received from the predetermined drive 4, the present invention is not limited to this.

For example, the changing unit 31b may add a predetermined value to the AWT of the OAF received from the predetermined drive 4, and the predetermined value may be a variable value or a fixed value as long as the AWT associated with the predetermined drive 4 can be changed so as to have higher priority than those of the AWTs of the OAFs received from the other drives 4. In this case, the timer 31c functions as a generating unit that generates the predetermined value, and the predetermined value generated by the timer 31c is set to the AWT timer of the AWT management table 32a.

Moreover, although the storage apparatus 1 according to the embodiment and the modification example described above includes one initiator 2 and two cascaded expanders 3, the present invention is not limited to this configuration.

For example, the storage apparatus 1 may include a plurality of redundant initiators 2. In this case, the functions as the acquisition unit 21a and the determining unit 21b and the drive type information 22a may be provided to the respective initiators 2 and may be provided to one representative initiator 2.

Further, three expanders 3 or more may be cascaded, and a plurality of redundant expanders 3 may be included. In this case, the respective expanders 3 are configured to be able to select one OAF from the OAF from the subordinate drive 4 and the OAF having the changed AWT received from the subordinate expander 3 and transmit the selected OAF to the superordinate expander 3.

A program (connection request transmission control program) for realizing the functions of the acquisition unit 21a, the determining unit 21b, the connection request transmission controller 31a, the changing unit 31b, and the timer 31c is provided in a form of being recorded on a computer-readable recording medium such as flexible disks, CDs (CD-ROM, CD-R, CD-RW, and the like), DVDs (DVD-ROM, DVD-RAM, DVD-R, DVD+R, DVD-RW, DVD+RW, HD DVD, and the like), blu-ray discs, magnetic disks, optical discs, and opto-magnetic discs. Moreover, a computer reads the program from the recording medium, transmits and stores the program to and in an internal storage device or an external storage device, and uses the program. Moreover, the program may be recorded in a storage device (recording medium) such as magnetic disks, optical discs, and opto-magnetic discs and be provided from the storage device to the computer via a communication line.

In order to realize the functions of the acquisition unit 21a, the determining unit 21b, the connection request transmission controller 31a, the changing unit 31b, and the timer 31c, the program stored in an internal storage device (in the present embodiment, the memory 22 or/and the memory 32, or ROM (not illustrated)) is executed by a microprocessor (in the present embodiment, the processor 21 or/and the processor 31) of the computer. In this case, the program recorded on the recording medium may be read and executed by the computer.

In the present embodiment, the computer is a concept that includes hardware and an operating system and unit hardware that operates under the control of the operating system. Moreover, when an operating system is not necessary, and hardware is operated solely by an application program, the hardware itself corresponds to the computer. The hardware includes at least a microprocessor such as a CPU and means for reading a computer program recorded on the recording medium, and in the present embodiment, the storage apparatus 1 (the initiator 2 or/and the expander 3) has the function of the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) has (have) been described in detail, it should be understood that the various changes, substitutions, and alterations could be made hereto without departing from the spirit and scope of the invention.

What is claimed is:

1. A connection apparatus that connects a plurality of storage units and a controller that establishes connection with the respective storage units in response to a connection request issued from each of the plurality of storage units and accesses the storage units, the connection apparatus comprising
a processor; and a memory, wherein
the processor
transmits a connection request selected based on priority information that represents priority associated with the connection among a plurality of received connection requests to the controller, the priority information being stored in the memory, and
changes priority information included in a connection request received from a certain storage unit among the plurality of storage units so that the priority information has higher priority than the priority information included in connection requests received from the other storage units for a period where a connection request is successively received from the certain storage unit and a predetermined condition is satisfied, the predetermined condition comprising a predetermined number of times of establishment of connection between the certain storage unit and the controller in succession.

2. The connection apparatus according to claim 1, wherein
in the transmitting of the connection request, the processor transmits a connection request to the controller, the connection request being selected based on the priority information included in a plurality of connection requests received from the plurality of storage units respectively and the priority information which is received from another connection apparatus that is connected to the connection apparatus and includes a processor equivalent to the processor of the connection apparatus, and which is included in the connection request from the certain storage unit among a plurality of storage units different from the plurality of storage units and is changed by the other connection apparatus.

3. The connection apparatus according to claim 1, wherein the processor changes the priority information included in the connection request received from the certain storage unit so that the priority information has higher priority than the priority information included in the connection requests received from the other storage units, each time the processor receives the connection request from the certain storage unit until the connection between the certain storage unit and the controller is successively established the predetermined number of times, for a period where the connection request is successively received from the certain storage unit.

4. A connection apparatus that connects a plurality of storage units and a controller that establishes connection with the respective storage units in response to a connection request issued from each of the plurality of storage units and accesses the storage units, the connection apparatus comprising
a processor; and a memory, wherein
the processor
transmits a connection request selected based on priority information that represents priority associated with the connection among a plurality of received connection requests to the controller, the priority information being stored in the memory, and
changes priority information included in a connection request received from a certain storage unit among the plurality of storage units so that the priority information has higher priority than the priority information included in connection requests received from the other storage units for a period where a connection request is successively received from the certain storage unit and a predetermined condition is satisfied, wherein
the memory stores management information in which a successive connection count that represents the number of times that the connection between the storage unit and the controller is successively established and a prescribed successive connection count that represents a threshold value of the number of times that the storage unit is allowed to successively establish the connection are correlated for each storage unit, wherein
in the changing of the priority information, the processor determines that the predetermined condition is satisfied when the successive connection count corresponding to the certain storage unit is smaller than the prescribed successive connection count.

5. The connection apparatus according to claim 4, wherein
the processor generates change information for changing the priority information associated with the certain storage unit so as to have higher priority than those of the priority information associated with the other storage units for the transmitting of the connection request, and
in the changing of the priority information, the processor changes the priority information associated with the certain storage unit based on the generated change information corresponding to the certain storage unit for a period where a connection request is successively received from the certain storage unit and the predetermined condition is satisfied.

6. The connection apparatus according to claim 5, wherein
the priority information is information that represents a wait period after the certain storage unit issues the connection request, and
in the generating of the priority information, the processor generates the change information for changing the priority information associated with the certain storage unit so as to have a longer wait period than the wait periods of the other storage units for the transmitting of the connection request.

7. The connection apparatus according to claim 5, wherein
in the generating of the change information, the processor has a function of a timer corresponding to each of the plurality of storage units, and generates the change information, of which the value changes with the elapse of time, for each storage unit.

8. The connection apparatus according to claim 4, wherein
the memory further stores connection determination information in the management information in correlation for each storage unit, the connection determination information representing whether the corresponding storage unit is a storage unit of which the connection with the controller has been just previously established, and
in the changing of the priority information, the processor determines that the storage unit that issued the connection request to be the certain storage unit when the connection determination information corresponding to the storage unit that issued the connection request is in a valid state that represents that the storage unit is a storage unit of which the connection with the controller has been just previously established.

9. The connection apparatus according to claim 8, wherein
in the changing of the priority information, when the connection request is received from the certain storage unit and the successive connection count corresponding to the certain storage unit is the same as the prescribed successive connection count, the processor initializes the change information corresponding to the certain storage unit and initializes the corresponding successive connection count.

10. The connection apparatus according to claim 8, wherein
the memory further stores connection request information in the management information in correlation for each storage unit, the connection request information representing whether the storage unit successively issues the connection request, and
in the changing of the priority information, when the connection determination information corresponding to the storage unit that issued the connection request is in a valid state, the corresponding connection request information is in a valid state that represents that the connection request is successively issued, and the corresponding successive connection count is smaller than the prescribed successive connection count, the processor changes the priority information associated with the storage unit.

11. The connection apparatus according to claim 10, wherein
in the changing of the priority information, when the connection request is not issued from the certain storage unit, the processor initializes the corresponding successive connection count and sets the corresponding connection request information to an invalid state.

12. The connection apparatus according to claim 10, wherein
in the changing of the priority information, when a connection request is received from a storage unit of which the connection request information is in an invalid state, the processor sets the corresponding connection request information to a valid state and initializes the corresponding change information.

13. The connection apparatus according to claim 4, wherein
in the transmitting of the connection request, when the connection with the storage unit established by the controller ends, the processor receives the connection request from each of the plurality of storage units for a predetermined connection request reception period, and
in the changing of the priority information, the processor changes, over a plurality of successive connection request reception periods, the priority information associated with the certain storage unit when the connection request is received from the certain storage unit and the successive connection count corresponding to the certain storage unit is smaller than the prescribed successive connection count.

14. The connection apparatus according to claim 4, wherein
the prescribed successive connection count is set in advance based on property information corresponding to a property of the storage unit.

15. The connection apparatus according to claim 4, wherein
the processor sets the prescribed successive connection count which is determined by the controller based on the respective items of property information corresponding to the properties of the plurality of storage units and which is transmitted from the controller in the management information stored in the memory.

16. A storage apparatus comprising:
a plurality of storage units;
a controller that establishes connection with the respective storage units in response to a connection request issued from each of the plurality of storage units and accesses the storage units; and
a first connection unit that connects the plurality of storage units and the controller, wherein
the first connection unit includes:
a processor; and a memory, wherein
the processor
transmits a connection request selected based on priority information that represents priority associated with the connection among a plurality of received connection requests to the controller, the priority information being stored in the memory, and
changes priority information included in a connection request received from a certain storage unit among the plurality of storage units so that the priority information has higher priority than the priority information included in connection requests received from the other storage units for a period where a connection request is successively received from the certain storage unit and a predetermined condition is satisfied, the predetermined condition comprising a predetermined number of times of establishment of connection between the certain storage unit and the controller in succession.

17. A non-transitory computer-readable recording medium having a connection request transmission control program recorded therein, the program causing a computer as a storage apparatus which includes a plurality of storage units, a controller that establishes connection with the respective storage units in response to a connection request issued from each of the plurality of storage units and accesses the storage units, and a connection unit that connects the plurality of storage units and the controller to allow the connection unit to execute:
transmitting a connection request selected based on priority information that represents priority associated with the connection among a plurality of received connection requests to the controller; and
changing priority information included in a connection request received from a certain storage unit among the plurality of storage units so that the priority information has higher priority than the priority information included in connection requests received from the other storage units for a period where a connection request is successively received from the certain storage unit and a predetermined condition is satisfied, the predetermined condition comprising a predetermined number of times of establishment of connection between the certain storage unit and the controller in succession.

* * * * *